United States Patent [19]

Sakaki et al.

[11] Patent Number: 4,472,812
[45] Date of Patent: Sep. 18, 1984

[54] KALMAN EQUALIZER

[75] Inventors: Hiroshi Sakaki; Sotokichi Shintani, both of Tokyo, Japan

[73] Assignee: Kokusai Denshin Denwa Co., Ltd., Tokyo, Japan

[21] Appl. No.: 336,152

[22] Filed: Dec. 31, 1981

[30] Foreign Application Priority Data

Jan. 13, 1981 [JP] Japan .................................. 56-2593

[51] Int. Cl.³ ..................... H04L 25/03; H03H 15/02; H04B 3/18
[52] U.S. Cl. ..................................... 375/14; 364/124; 333/18
[58] Field of Search .................. 333/18; 364/724, 825; 375/12, 14, 15, 16

[56] References Cited

U.S. PATENT DOCUMENTS 4,288,872  9/1981  Tamburelli ......................... 364/724
4,320,526  3/1982  Gitlin ................................... 375/14

OTHER PUBLICATIONS

International Journal of Control U.S.A., 1978, vol. 27, No. 1, pp. 1–19.

Primary Examiner—Benedict V. Safourek
Attorney, Agent, or Firm—Collard, Roe & Galgano

[57] ABSTRACT

An improved Kalman equalizer for providing a tap weight of a transversal filter for equalizing a transmission line has been found. A complex number fast Kalman equalizer (FIG. 27), which is the improvement of the prior fast real number Kalman equalizer (see; "Fast calculation of gain matrices for recursive estimation schemes" by Lennart Ljung, et al, INT. J. Control, 1978, vol. 27, No. 1, 1–19), has a complex conjugate generator ($C_2$) for processing a complex input signal so that an equalization can be performed on the bandwidth division concept, and a transmission line having a complex impulse response can be equalized. Then, a bandwidth division equalization in which a whole bandwidth is separated into a plurality of sub-bandwidth each being equalized by a related sub-equalizer becomes possible. Also, a QAM signal (Quadrature Amplitude Modulation) which has a complex impulse response can be equalized. A bandwidth division fast Kalman equalizer (FIG. 68) is also possible as the modification of the present invention.

2 Claims, 75 Drawing Figures

KALMAN EQUALIZER

BACKGROUND OF THE INVENTION

This invention is concerned with automatic equalizer for data transmission having less calculation amount and faster and stabler convergence characteristics.

Formerly, there were two types of automatic equalizers, one of which is a learn and identification type equalizer or ordinary equalizer having slow and unstable convergence and the other type of which is a fast Kalman equalizer for AM modulation systems having fast and stable convergence. However, these have shortcomings, namely, slow and unstable convergence, large amount of calculating labour or restriction of usage to AM modulation, respectively.

Further, prior Kalman equalizers have the disadvantage that only real number signals are handled, but complex number signals can not be handled.

SUMMARY OF THE INVENTION

The general purpose of the present invention is to overcome said disadvantages of prior equalizers.

The present invention is aimed to provide a bandwidth division type Kalman equalizer in which a hardware amount for the calculation is reduced, the operation is stable, and the faster convergence characteristics are obtained.

Another object of the present invention is to provide a Kalman type equalizer, in which a complex number is dealt with, and a QAM modulation signal is also dealt with.

According to the present invention, a fast Kalman equalizer having a complex impulse response for equalizing a complex input signal comprises;

(a) an input terminal $Q_5$ for receiving an input signal $g_k$, (b) a transversal filter (TFQ) having at least a tapped delay line (TDLQ$_1$) with a plurality of taps and an adder (SUMQ$_1$) for summing up all the tap outputs of said tapped delay line (TDLQ$_1$), (c) an output terminal $Q_7$ coupled with the output of said adder (SUMQ$_1$) for providing an equalized output signal, (d) a tap gain memory (RQ) for providing a tap coefficient to said tapped delay line (TDLQ$_1$), by accepting the increment of the tap weight using the formula $\Delta \hat{h}_k = k_k e_k$ (Eq. 12), (e) a multiplicator (MQ$_{22}$) for providing the product of the reference signal $e_k$ from a reference terminal ($Q_6$) and $k_k$ (Eq. 14), (f) an A-register control (PTAQ) for providing the values $q_k$ (Eq. 18) and $A_k$ (Eq. 18') according to the vectors $x_k$ (Eq. 9), $x_{k+1}$ (Eq. 16), $k_k$, and $A_{k-1}$, (g) an S-register control (PTSQ) for providing (a) $\bar{v}_k$ which is the complex conjugate of $v_k$ by the generator (C$_2$), said $v_k$ is obtained by Eq. 19 ($v_k = g_k + A_k^T \cdot x_k$, where $A_k^T$ is the transposed matrix of the matrix $A_k$), and (b) $S_k = S_{k-1} + \bar{v}_k g_k$ (Eq.20'), according to the values $A_k$, $x_k$, and $g_k$, (h) a D-register control (PTDQ) for providing $D_k$ (Eq. 25), $m_k$ (Eq. 22 and Eq. 21), and $w_k$ (Eq. 23), (i) a k-register control (PTkQ) for providing $k_{k+1}$ by the formula; $k_{k+1} = m_k - D_k w_k$ (Eq. 26), (j) means for providing the value $k_{k+1}$ obtained in said item (i) to the multiplicator (MQ$_{22}$) of the item (e), the A-register control (PTAQ) of the item (f), and the D-register control (PTDQ) of the item (h), for the next step calculation.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

First, some background idea of the present invention will be described for the easy understanding of the invention.

Figure 1:
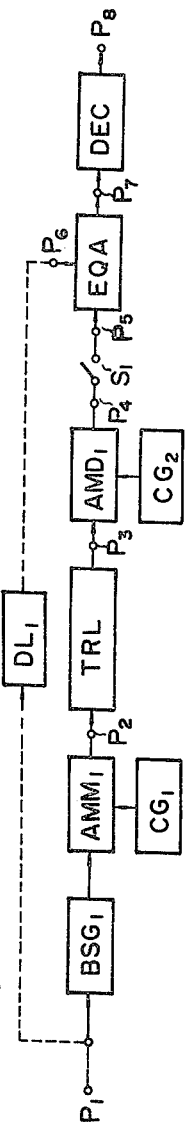
FIG. 1 is a block diagram of AM modulation data transmission system.
Figure 2:
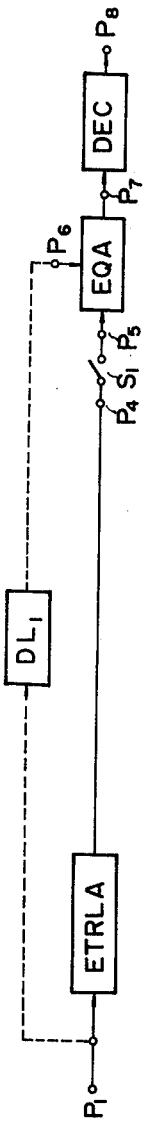
FIG. 2 is a figure of equivalent circuit for AM modulation data transmission system.

FIG. 1 is a block diagram of an AM modulation data transmission system. In FIG. 1, $P_1$, $P_2$, $P_3$, $P_4$, $P_5$, $P_6$, $P_7$, and $P_8$ are input point of information symbol, output point of transmission terminal equipment, input point of receiving terminal equipment, input point of sampler, input point of automatic equalizer, input point of reference signal, output point of automatic equalizer and output point of decision circuit, respectively. Furthermore $BSG_1$, $AMM_1$, $CG_1$, $CG_2$, TRL, $AMD_1$, $S_1$, EQA, DEC, and $DL_1$ are base band signal generator, AM modulator, carrier generator at transmission equipment terminal, carrier generator at receiving equipment terminal, transmission line, AM demodulator, sampler, automatic equalizer, decision circuit and imaginary delay line explained later. Information symbol value is generated in T second interval, which is called as symbol sending interval of this transmission system, at point $P_1$. The values of information symbols are chosen among the formerly prescribed values and carry information. Time series of information symbol values passes through the base band generator $BSG_1$, which operates as low pass filter and which makes the modulating operation at modulator $AMM_1$ easier, and consecutively introduced in AM modulator $AMM_1$ and is modulated there. This AM modulator is controlled by carrier generator $CG_1$ generating carrier expressed as $\cos \omega_c t$. This means the frequency of the carrier is $\omega_c$ (radian/second). Output signal of AM modulator passes through output point of transmission terminal equipment, enters in transmission line TRL and appears at input point of receiving terminal equipment. This signal then enters at AM demodulator $AMD_1$ and is demodulated. $CG_2$ is a carrier generator operating in synchronization with the carrier generator $CG_1$ at the transmission equipment terminal. Output signal of $AMD_1$ is applied, at input point of sampler $P_4$, to sampler $S_1$ which samples incoming signal at T second interval. The output signal of the sampler is generated at $P_5$ which is input point of automatic equalizer. The automatic equalizer operates under the control of input signal to automatic equalizer generated at $P_5$ and reference signal generated at $P_6$. The parameters at automatic equalizer is adjusted so that output value of equalizer becomes as near as possible to the reference signal applied at $P_6$. The above mentioned reference signal is chosen to be the information signal value at $P_1$ but affected under the effect of a certain amount of delay caused by imaginary delay line $DL_1$. Equalizer output signal generated at point $P_7$ is introduced to decision circuit which eliminates noise signal and produces correct information signal value corresponding one of the formerly prescribed information values. Thus communication information is finally extracted. The dotted line and imaginary delay line $DL_1$ in FIG. 1 are added to explain the nature of reference signal which is input information symbol delayed at $DL_1$. These parts act as equivalent circuit in the figure. At actual transmission system, reference signal generated at $P_5$ is obtained as output signal of decision circuit DEC given at $P_8$ or obtained by producing it independently at receiving terminal equipment when transmitted symbol sequence is known. The above mentioned thing is situation for actual data transmission system. Components $BSG_1$, $AMM_1$, $CG_1$, TRL, $AMD_1$, and $CG_2$ can be replaced by equivalent base band transmission line ETRLA as shown in FIG. 2. The operation of automatic equalizer can be expressed easier through the use of this equivalent circuit. Other parts, in this case, can be regarded as unchanged. Following these lines of consideration, it will be easily understood that automatic equalizer EQA provides inverse characteristics of equivalent base band transmission line ETRLA and that the cascade connection of ETRLA and automatic equalizer EQA must be reduced to be a delay line with the same delay given in delay line $DL_1$. The configuration of FIGS. 1 and 2 can deal only with real number values including information symbol values generated at $P_1$. As AM modulation data transmission system accepts only real number, this type of system is called as real number data transmission system and automatic equalizer EQA in this system is called real number automatic equalizer.

Figure 3:
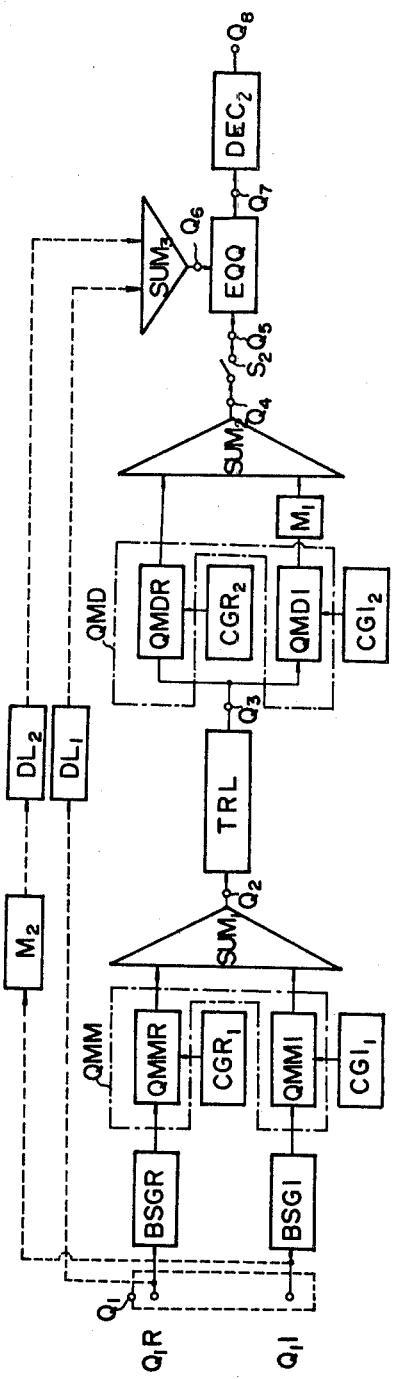
FIG. 3 is a block diagram of QAM modulation data transmission system.

QAM modulation system will be shown next. FIG. 3 is a block diagram of QAM modulation data transmission system. $Q_1R$ and $Q_1I$, in this figure, are input point of real number information symbol and input point of imaginary number information symbol respectively and these two points are combined into input point of information symbol $Q_1$. Points $Q_2$, $Q_3$, $Q_4$, $Q_5$, $Q_7$ and $Q_8$ are output point of transmission terminal equipment, input point of receiving terminal equipment, input point of sampler, input point of automatic equalizer, input point of reference signal, output point of automatic equalizer and output point of decision circuit, respectively. BSGR and BSGI are a base band signal generator for real number and a base band signal generator for imaginary number, respectively. These have characteristics of low pass filter. QMMR and QMMI are QAM modulator for real number and QAM modulator for imaginary number, respectively, and the component consisted of these two circuits is called QAM modulator QMM. $CGR_1$ is carrier generator for real number at transmission terminal equipment which generates carrier wave $\cos \omega_c t$ with angle frequency of $\omega_c$ (radian/second) and controls aforementioned QAM modulator for real number QAMMR. $CGI_1$ is also carrier generator for imaginary number which generates carrier wave $\sin \omega_c t$ and controls QMMI. $SUM_1$ is an adder which simply adds its two inputs. TRL is, as formerly explained, transmission line. QMDR is QAM demodulator for real number and QMDI is QAM demodulator for imaginary number and these two parts are combined into QAM demodulator QMD. $CGR_2$ and $CGI_2$ are carrier generators at receiving terminal equipment and generate, in synchronization with $CGR_1$ and $CGRI_1$ respectively at the transmission terminal equipment, carrier waves $\cos \omega_c t$ and $\sin \omega_c t$ respectively and drives QMDR and QMDI respectively. $M_1$ is imaginary number unit multiplier and multiplies imaginary number unit $j$ to input providing the result at its output. $SUM_2$ and $S_2$ are an adder and a sampler, respectively. EQQ is QAM automatic equalizer called complex number automatic equalizer as a result of its ability to deal with complex number. $DEC_2$ is decision circuit. $M_2$ is, as $M_1$, imaginary unit multiplier. $SUM_3$ is adder. $DL_1$ and $DL_2$ are delay lines with a certain amount of delay providing the same effect as that of $DL_1$ in FIG. 1.

Figure 4:
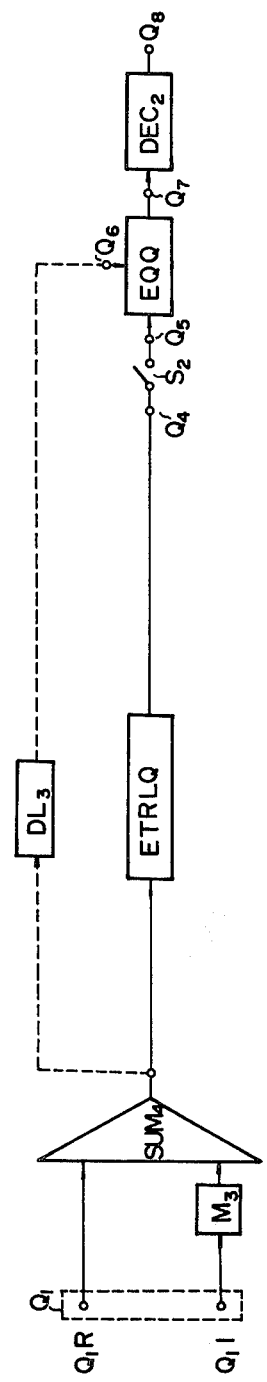
FIG. 4 is a figure of equivalent circuit for QAM modulation data transmission system.

Next, the operation of QAM data transmission system in FIG. 3 will be explained. At $Q_1R$ and $Q_1I$ real number information symbol and imaginary number information symbol are generated respectively with the interval of T second which is symbol sending interval of this transmission system. The values generated must be chosen from formerly prescribed set of values. Imaginary number information symbols, of course, must take real number for their values and not imaginary numbers in the actual transmission system. The reason why these values are called imaginary will be explained later. The time series of information symbols generated at $Q_1R$ and $Q_1I$ respectively are introduced to base band signal generator for real number BSGR and base band signal generator for imaginary number BSGI respectively and consecutively modulated by modulators QMMR and QMMI respectively. It must be noticed that carriers which are generated at $CGR_1$ and $CGI_1$ respectively and which control two modulators are different in phase by 90 degree from each other. Output signals from QMMR and QMMI are summed up at $SUM_1$ and sent to transmission line TRL through the output point of transmission terminal equipment $Q_2$. Output signal of transmission line appears at input point of receiving terminal equipment $Q_3$. The signal is led to QAM demodulator for real number QMDR and QAM demodulator for imaginary number QMDI respectively both of them conducting QAM demodulation operation. Two carrier generators $CGR_2$ and $CGI_2$ which operate in synchronization with carrier generators at the transmission terminal equipment generate carrier waves $\cos \omega_c t$ and $\sin \omega_c t$ respectively. To the output signal of QMDI, imaginary number unit $j$ is multiplied at the imaginary unit multiplier $M_1$ and the result is added with output signal of QMDR at the adder $SUM_2$. Output value of $SUM_2$ is introduced to sampler $S_2$ which samples its input signal at T second interval. The output of the sampler appears at the input point of automatic equalizer $Q_5$. Complex number automatic equalizer EQQ operates in accordance with input signal of automatic equalizer and reference signal at $Q_6$ adjusting parameters in the automatic equalizer so that output signal of the complex number automatic equalizer reaches as near as possible to the reference signal. The component expressed in dotted line is to show that the reference signal generated at $Q_6$ is the value given as the output signal of adder $SUM_3$ which admits two signals as its input, one of which is value at the input point of real number information symbol $Q_1R$ delayed by delay line $DL_1$ for a certain amount of delay, and the other of which is value at the input point of imaginary number information symbol $Q_1I$ multiplied by imaginary unit $j$ at the imaginary number unit multiplier $M_2$ and delayed by $DL_2$ having the same delay of $DL_1$. The reference signal will be, as explained at the part of AM modulation, often made at receiving terminal equipment. Equalizer output at point $Q_7$ is introduced to decision circuit $DEC_2$, where noise is eliminated giving rise to re-generation of information symbols which take values from prescribed set of values. These are situations for actual data transmission system. BSGR, BSGI, QMMR, QMMI, $CGR_1$, $CGI_1$, $SUM_1$, TRL, QMDR, QMDI, $CGR_2$, $CGI_2$ and $SUM_2$ can be replaced by and equivalent circuit called complex number equivalent base band transmission line ETRLQ as shown in FIG. 4. The operation of equalizer can be understood easier using this equivalent circuit. The complex number equivalent base band transmission line ETRLQ has complex number values as its impulse response. In the case generation part of input information symbol and reference signal can be combined as shown in FIG. 4. In FIG. 4, $M_3$ is imaginary number unit multiplier, and $DL_3$ is complex number delay line, and $SUM_4$ is adder. Input signal to complex number equivalent base band transmission line ETRLQ can be obtained as output signal of adder $SUM_4$ and called complex number information symbol which becomes to be reference signal after passing through complex number delay line $DL_3$. The adder $SUM_4$ admits two inputs, one of which is real number information symbol introduced at $Q_1R$ and the other of which is imaginary number information symbol introduced at $Q_1I$ multiplied by imaginary number unit at $M_3$. Under this situation, complex number automatic equalizer EQQ must provide inverse transmission function of complex number equivalent base band transmission line ETRLQ and cascade connection of EQQ and ETRLQ can be replaced by a single delay line having the same amount of delay as that of $DL_3$. As shown above, the system shown in FIG. 4 can deal with complex values as exemplified with its complex number information symbol and complex number equivalent base band transmission line having impulse response of complex number. Consequently this kind of QAM modulation data transmission system is called as complex number data transmission system and the equalizer EQQ in the system is of course called complex number automatic equalizer.

Figure 5:
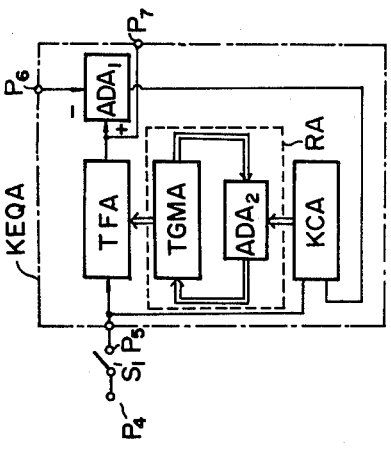
FIG. 5 is a block diagram of real number Kalman equalizer.

The role of automatic equalizers are explained and configurations and operation methods of automatic equalizers are shown so far. Henceforth configuration and operation of automatic equalizers will be treated. First, two kinds of systems which are composing elements of this invention will be dealt with. They are real number Kalman equalizer and complex number Kalman equalizer. At the beginning, real number Kalman equalizer will be discussed. Composing method of EQA in FIGS. 1 and 2 which is called real number automatic equalizer using real number Kalman equalizer will be shown. Inner structure of EQA when composed by real number Kalman equalizer is divided into large sections as shown in FIG. 5. KEQA is real number Kalman equalizer and can be used as EQA. The junction points of KEQA to outer circuits are, as shown in FIGS. 1 and 2, $P_5$, $P_6$ and $P_7$ which are input point of automatic equalizer, input point of reference signal and output point of automatic equalizer respectively. $P_4$ is input point of sampler. $S_1$ is sampler as is shown in FIGS. 1 and 2. In FIG. 5, single lines denote single leads and double lines denote multi leads. TFA and TGMA denote real number transmission function and real number tap gain memory respectively. Both $ADA_1$ and $ADA_2$ are real number adders and KCA is real number Kalman controller. TGMA and $ADA_2$ as a whole, is called real number resister RA.

The operation of the system in FIG. 5 is explained now. Real number equivalent base band transmission line ETRLA output appearing at $P_4$ is sampled at sampler $S_1$ at the frequency of every T second. The output signal of $S_1$ enters the real number transmission function TFA. TFA obtains information from real number tap gain memory TGMA and constitutes transmission function of this real number Kalman equalizer KEQA with the aid of TGMA and generates, at the output point of automatic equalizer $P_7$, convolution result of equalizer input signal and transmission function of EQA stored at TGMA. The difference of equalizer output and reference signal appearing at $P_6$ is obtained at the adder $ADA_1$ according to the sign shown in the figure. $ADA_1$ output and equalizer input appearing at $P_5$ enter into real number Kalman controller KCA. KCA calculates variation value of real number tap gain memory TGMA storage and adds the value emerged from KCA to the former storage of TGMA with the aid of adder $ADA_2$ providing new storage of TGMA. This operation is repeated every time when signal appears at $P_5$ from $S_1$. The real number Kalman equalizer KEQA operates to make the output of $ADA_1$ smaller in the sense of power. The above is rather simple sketch of real number Kalman equalizer KEQA, to which more detailed explanation will follow.

Figure 6:
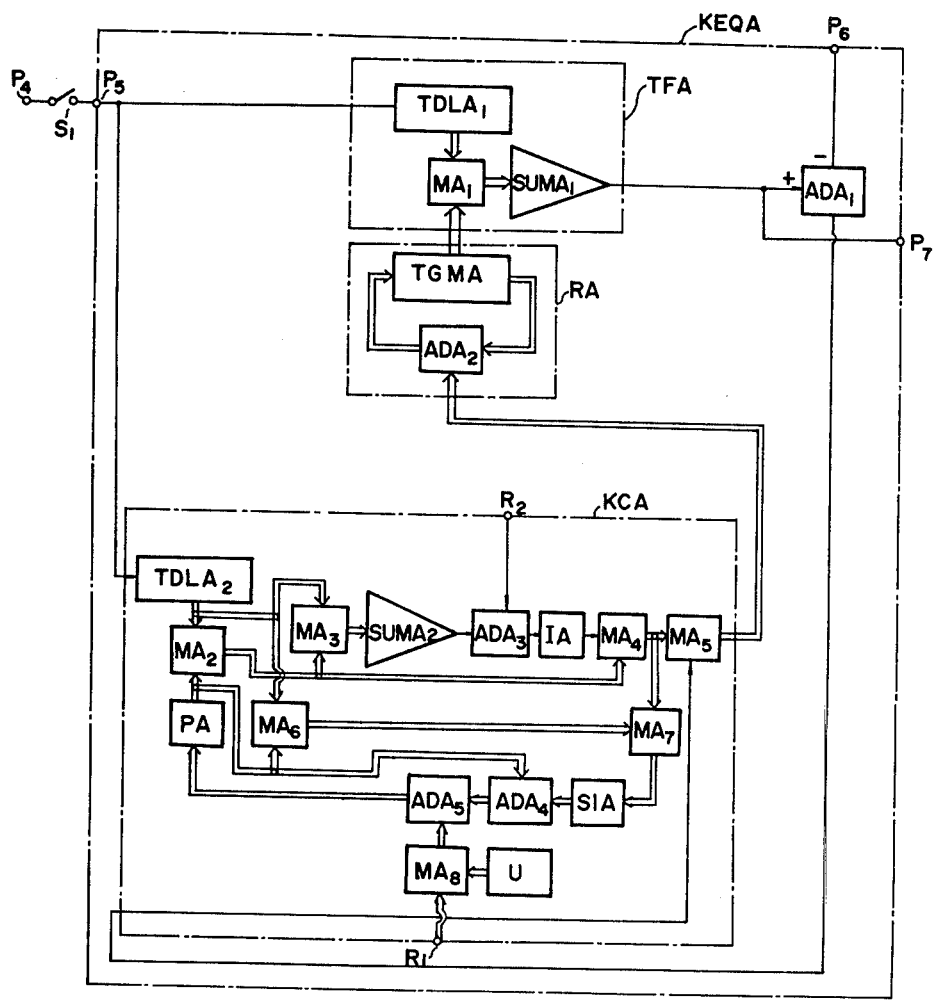
FIG. 6 is a detailed figure for real number Kalman equalizer.

FIG. 6 is more minute expression of real number Kalman equalizer KEQA with re-division, into more small components, of the expression in FIG. 5. In FIG. 6, $TDLA_1$ and $TDLA_2$ are real number tapped delay line of length M. M is a prescribed integer and equalization becomes more precise as M becomes larger. $MA_1$ to $MA_8$ are real number multipliers. $ADA_1$ to $ADA_5$ are real number adders. $SUMA_1$ and $SUMA_2$ are real number concentrators. IA, SIA, U and PA are real number inverse value generator, real number sign inverter, unit matrix generator and real number P resister, respectively. $S_1$ is sampler which, as is in FIG. 4, samples its input signal every T second. KEQA, TFA, TGMA, RA and KCA are as shown before real number Kalman equalizer, real number transmission function, real number tap gain memory, real number resister and real number Kalman controller respectively. They are the same components of the ones of the same notation in FIG. 4. Single lines and double lines denote single leads and multi leads respectively, situation being the same with that in FIG. 4. $P_5$ to $P_7$ denote the same point as these in FIG. 4 with the same notations. Operation of real number Kalman equalizer KEQA shown in FIG. 6 will be shown below. First, real number transmission function TFA and real number resister RA will be dealt with. Real number tapped delay line $TDLA_1$ will generate input vector $x_k$ shown in following Eq. (1), where input signal at input point of automatic equalizer $P_5$ and at the time k (k is time variable of integer value) is denoted by $g_k$.

$$x_k = \begin{bmatrix} g_k \\ g_{k-1} \\ \vdots \\ \vdots \\ g_{k-(M-1)} \end{bmatrix} \quad (1)$$

Real number tap gain memory TGMA memorizes tap vector of dimension M, $\hat{h}_k$ which is the state of real number Kalman equalizer KEQA. Real number multiplier multiplies corresponding elements of $x_k$ and $\hat{h}_k$. Real number concentrator sums up the MA$_1$ output. MA$_1$ and SUMA$_1$, working in cooperation, operate the algebra of $$\hat{y}_k = x_k^T \hat{h}_k \tag{2}$$

and gives scalar number $\hat{y}_k$. T shows matrix transpose in this invention. Consequently the output signal of real number Kalman equalizer is $y_k$ given in Eq. (2). The action of real number adder ADA$_2$ will be shown at the passage concerning real number Kalman controller KCA. Operation of real number Kalman controller KCA will be shown now. Real number tapped delay line TDLA$_2$ have the same construction as that of TDLA$_1$ and its output is naturally input vector $x_k$. Real number P resister PA stores M×M matrix $P_k$ which is given afterwards. Real number multiplier MA$_2$ multiplies $P_k$ which is output of real number P resister PA with input vector $x_k$ generating M dimension vector $P_k x_k$. Real number multiplier MA$_3$ multiplies elements of output vector of MA$_2$ with corresponding elements of input vector $x_k$ which is output of real number tapped delay line TDLA$_2$. Real number concentrator SUMA$_2$ sums up multi-leaded output of MA$_3$. MA$_2$ and SUMA$_2$ working together generate scalar output of $x_k^T P_k x_k$. Point R$_2$ is input point of parameter $r_2$ which can be fixed value in the usual applications. This point is supposed to be connected to some appropriate circuit which generates the value $r_2$. Real number adder ADA$_3$ adds the value $r_2$ and output of real number concentrator SUMA$_2$. Real number inverse value generator IA generates inverse value of ADA$_3$ output. Real number multiplier MA$_4$ multiplies M dimensional vector $P_k x_k$ which is output of MA$_2$ with scalar output of IA. When output value of MA$_2$ is called as $K_k$, this value can be given as;

$$K_k = \frac{P_k x_k}{(x^T P_k x_k + r_2)} \tag{3}$$

as a result of formerly mentioned situation. Real number multiplier MA$_5$ multiplies M dimensional vector $K_k$ and error output of the equalizer $e_k$ given at the output point of ADA$_1$ giving rise to the result $\Delta \hat{h}_k$ which is M dimensional vector given by;

$$\Delta \hat{h}_k = K_k e_k \tag{4}$$

When reference signal is denoted by $y_k$, ADA$_1$ output $e_k$ will be of course given by;

$$e_k = y_k - \hat{y}_k \tag{5}$$

Real number adder ADA$_2$ conducts the operation of adding MA$_5$ output $\Delta \hat{h}_k$ to tap gain vector $\hat{h}_k$ stored in real number tap gain memory TGMS generating storage of TGMA at the next time slot which is k+1. Namely, the operation $$\hat{h}_{k+1} = \hat{h}_k + \Delta \hat{h}_k \tag{6}$$

is done. The configuration in FIG. 6, on the other hand, has the other adjustment portion. Operation concerning this portion will be explained hereafter. Output $P_k$ of real number P resister PA and output $x_k$ of real number tapped delay line are multiplied at real number multiplier MA$_6$ generating M dimensional vector $x_k^T P_k$. Multiplication between MA$_6$ output and MA$_4$ output which is $K_k$ and is given in Eq. (3) is conducted at real number multiplier MA$_7$ giving rise to M×M matrix $K_k x_k^T P_k$. MA$_7$ output is inverted in sign by real number sign inverter SIA and then added to real number P resister PA output $P_k$ at real number adder ADA$_4$ giving rise to $P_k - K_k x_k^T P_k$. A scalar $r_1$ introduced at point R$_1$ as a parameter and unit matrix I generated at unit matrix generator U are multiplied at real number multiplier MA$_8$ resulting in $r_1 I$, which is then added to ADA$_4$ output at the adder ADA$_5$. ADA$_5$ output is then $P_k - K_k x_k^T P_k + R_1 I$. Point R$_1$ is fed with fixed value $r_1$ and supposed to be connected to proper circuit generating value of $r_1$ as in the case of point R$_2$. ADA$_5$ output is now future content of real number P resister PA and is $P_{k+1}$ given by;

$$P_{k+1} = P_k - K_k x_k^T P_k + r_1 I = (I - K_k x_k^T) P_k + r_1 I \tag{7}$$

Real number Kalman equalizer shown is FIG. 6 reads data every T second using sampler S$_1$ and updates content of real number P resister PA and content of real number tap gain memory TGMA $\hat{h}_k$ with the aid of real number Kalman controller KCA and, as a result, brings $\hat{h}_k$ which is content of TGMA nearer to the inverse circuit of real number equivalent base band transmission line ETRLA and makes error signal $e_k$ smaller. Parameters R$_1$ and $r_2$ are used to make the operation of real number Kalman equalizer KEQA optimum. When time variation of ETRLA is large, R$_1$ is chosen to be value other than 0. Value of $r_2$ must be, on the other hand, chosen to be near to noise power generated in ETRLA for obtaining fast convergence of KEQA to the inverse circuit of ETRLA. The system in FIG. 6 will reach to convergence after M time slots when there are no variation of ETRLA and no noise. Of course, M is number of taps in real number tapped delay lines TDLA$_1$ and TDLA$_2$. This is prominent advantage of Kalman equalizer as a whole. This system, nevertheless, needs M$^2$ multiplications for one time slot in each of real number multipliers MA$_6$ and MA$_7$ resulting in large amount of operational labour. This will be the main reason why Kalman equalizer is not put into actual use in spite of its excellent fast convergence characteristics.

Figure 7:
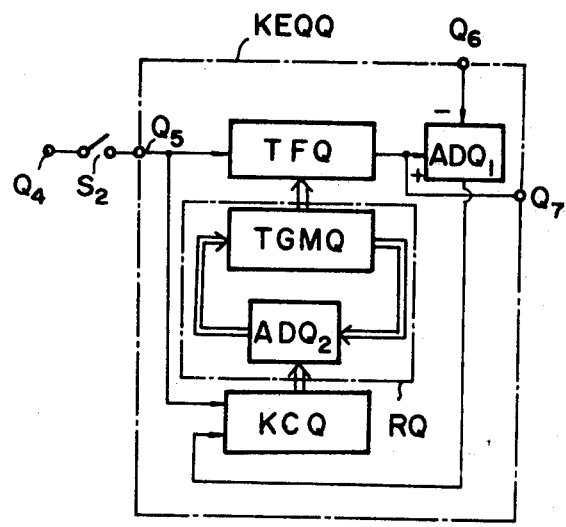
FIG. 7 is a block diagram of complex number Kalman equalizer.

Complex number automatic equalizer like EQQ in FIGS. 3 and 4 which deals with impulse response of complex number accompanying to QAM modulation will be treated hereafter. The equalizer will be divided into fairly large sections as shown in FIG. 7. KEQQ is complex number Kalman equalizer which is used as complex number automatic equalizer EQQ in FIGS. 3 and 4. KEQQ has junction points Q$_5$, Q$_6$ and Q$_7$ to outer circuit which are the same points as corresponding ones in FIGS. 3 and 4 and which denote input point of automatic equalizer, input point of reference signal and output point of automatic equalizer respectively. Q$_4$ is input point of sampler. S$_2$ is sampler which is the same part as one in FIGS. 3 and 4 with the same notation. As is in FIG. 5, single lines indicate single lead and double lines multiple lines in FIG. 7. TFQ is complex number transmission function and TGMQ is complex number tap gain memory. ADQ$_1$ and ADQ$_2$ denote complex number adders. KCQ represents complex number Kalman controller. Both TGMQ and ADQ$_2$ as a whole are called complex number resister RQ. The operation of the system will be discussed now. Transmission line output appears at $Q_4$ and sampled at the interval of T second by the sampler $S_2$. The output of $S_2$ enters in the complex number transmission function TFQ. TFQ obtains information from complex number tap gain memory TGMQ and provides transmission function of this automatic equalizer with the aid of TGMQ and generates at output point of automatic equalizer $Q_7$ convolved value of input signal and transmission function of automatic equalizer stored in TGMQ. Complex number adder produces difference between output of the complex number Kalman equalizer KEQQ and reference signal introduced at $Q_6$ according to the sign notation shown in the figure. $ADQ_1$ output and equalizer input appearing at $Q_5$ are introduced into complex number Kalman controller KCQ. Using these two inputs, KCQ calculates change of the content of complex tap gain memory TGMQ and adds this value to the former content of TGMQ and as a result provides new storage of TGMQ. These operations are repeated every time when signal appears at $Q_5$ through $S_2$ and KEQQ operates to make the $ADQ_1$ output power smaller.

Figure 8:
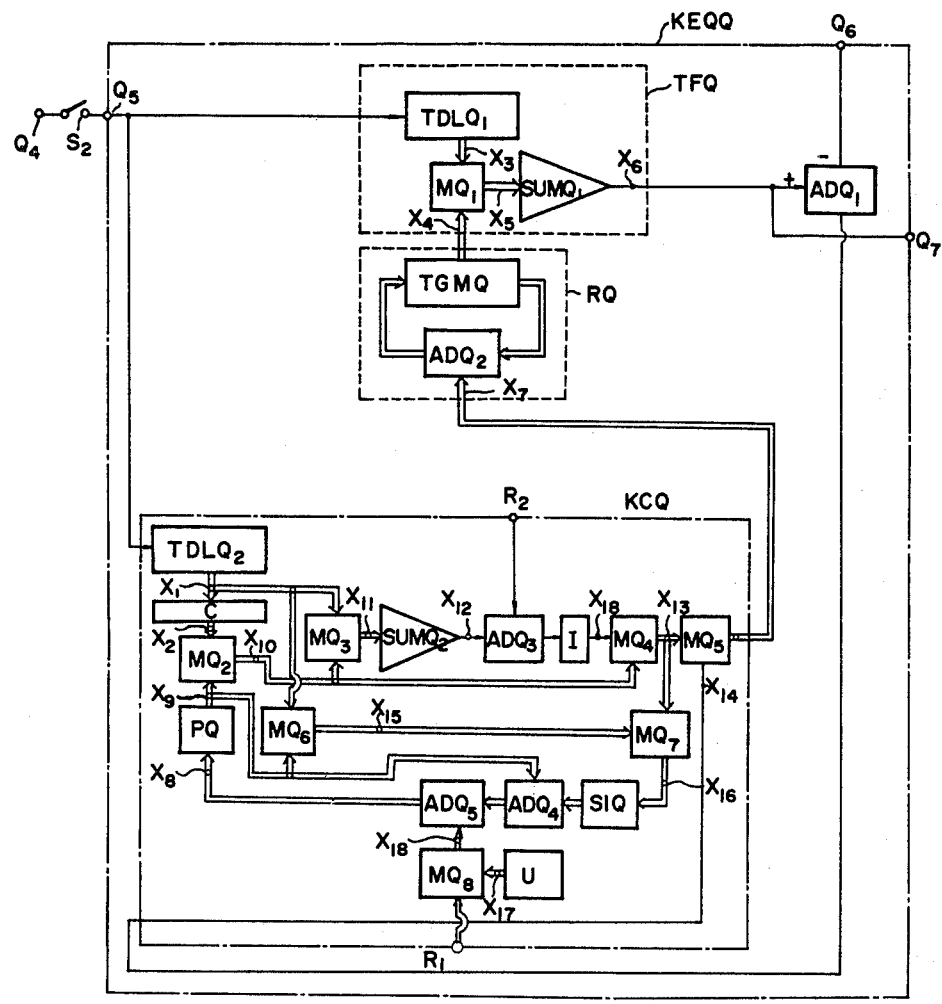
FIG. 8 is a detailed figure for complex number Kalman equalizer.

These are summary of operation of complex number Kalman equalizer KEQQ. Here more detailed description will be made using FIG. 8. In FIG. 8, points $X_1$ to $X_{18}$ are defined. These points are used in figures beginning with FIG. 9 to show the relation with FIG. 8. Superficially FIG. 8 differs from FIG. 6 which represents composition of real number type in that complex conjugate generator C is added between points $X_1$ and $X_2$. Following is the description of FIG. 8.

All situation described in FIGS. 5 and 6 remains the same with KEQQ in FIG. 8. Nevertheless, in the system shown in FIGS. 7 and 8, the values dealt with are complex ones and all multipliers and adders are altered to process complex numbers. Though there is little difference between construction of FIGS. 5 and 6 and that of FIGS. 7 and 8, substantially a large change has took place. The complex number Kalman equalizer KEQQ shown in FIGS. 7 and 8 is not only used in QAM modulation system but also used as indispensable component of bandwidth division equalizers which is component of this invention. C in FIG. 8 is complex conjugate generator. KEQQ is of course complex number Kalman equalizer which can be used as KQQ in FIGS. 2 and 3. Summarized operation of the system of FIG. 8 according to sections under fairly large division, which are TFQ, RQ, $ADQ_2$ and KCQ, has been explained. These parts are expressed by notations used in corresponding parts in FIG. 6 with the change at last letters from A to Q showing that complex numbers are dealt with. Detailed illustration of each composing part in FIG. 8 will be done next. $TDLQ_1$ and $TDLQ_2$ in FIG. 8 are complex number tapped delay lines tap number of which are M (M is a prescribed integer). $MQ_1$ to $MQ_8$ are complex number multipliers. $ADQ_1$ through $ADQ_5$ are complex number adders. $SUMQ_1$ and $SUMQ_2$ are complex number concentrators. IQ, SIQ, U and PQ are complex number inverse value generator, complex number sign inverter, unit matrix generator and complex number P resister respectively. $S_2$ is also sampler sampling its input signal at the frequency of T second. As is in FIG. 7 single lines designate single leads and double lines multiple leads.

Following is the operation of complex number Kalman equalizer shown in FIG. 8. As the operations of component parts of this KEQQ equalizer are the same as these of component parts of the same names but the last letters being changed from Q to A in real number Kalman equalizer KEQA, explanation of operation is considerably omitted. Nevertheless, as the consequence of introduction of complex conjugate generator C and admission of complex values, Eq. (3) has been changed to;

$$K_k = P_k \bar{x}_k / (x_k^T P_k \bar{x}_k + r_2) \tag{3}'$$

The other equations can be used with no alternations except that characters in these equations now represent complex numbers. Namely, Eqs. (1), (2), (4), (5), (6) and (7) remain the same as equations dealing with complex numbers and Eq. (3) is replaced by Eq. (3)'. Substituting Eq. (3)' into Eq. (7), we get $$P_k = P_k - P_k x_k^T \bar{x}_k P_k / (x_k^T P_k \bar{x}_k + r_2) + R_k I \tag{8}$$

The terms $x_k^T \bar{x}_k$ and $x_k^T P_k \bar{x}_k$ in the above equation provide power of complex number time function and are apparently of positive real numbers showing that correct function of the system is assured. Complex conjugate generator C is indispensable for the adoption of complex number time functions.

Figure 9:
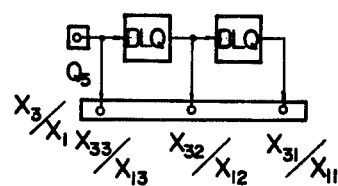
FIG. 9 is a detailed figure of compound type expression of complex number tapped delay lines TDLQ$_1$ and TDLQ$_2$.
Figure 10:
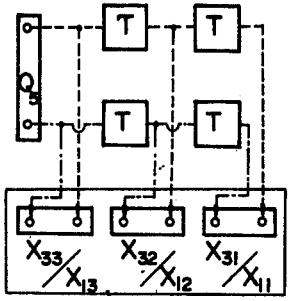
FIG. 10 is a detailed figure of separate type expression of complex number tapped delay lines TDLQ$_1$ and TDLQ$_2$.
Figure 11:
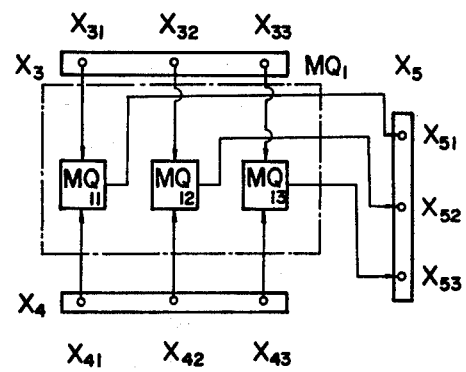
FIG. 11 is a detailed figure for complex number multiplier MQ$_1$.
Figure 12:
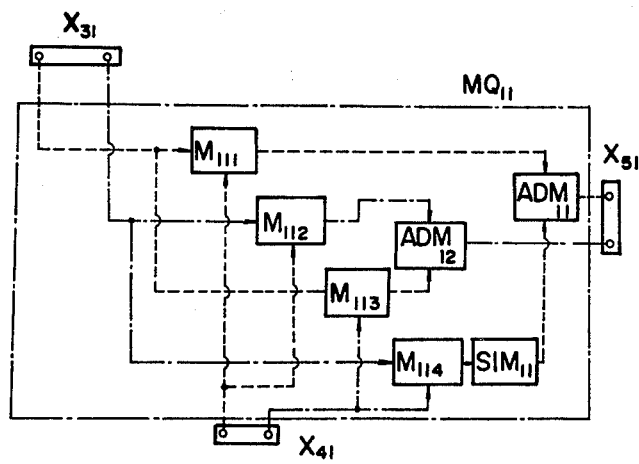
FIG. 12 is a detailed figure of separate type expression for complex number multiplier MQ$_{11}$.
Figure 13:
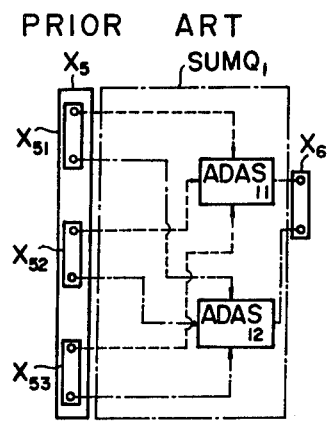
FIG. 13 is a detailed figure of separate type expression for complex number concentrator SUMQ$_1$.
Figure 14:
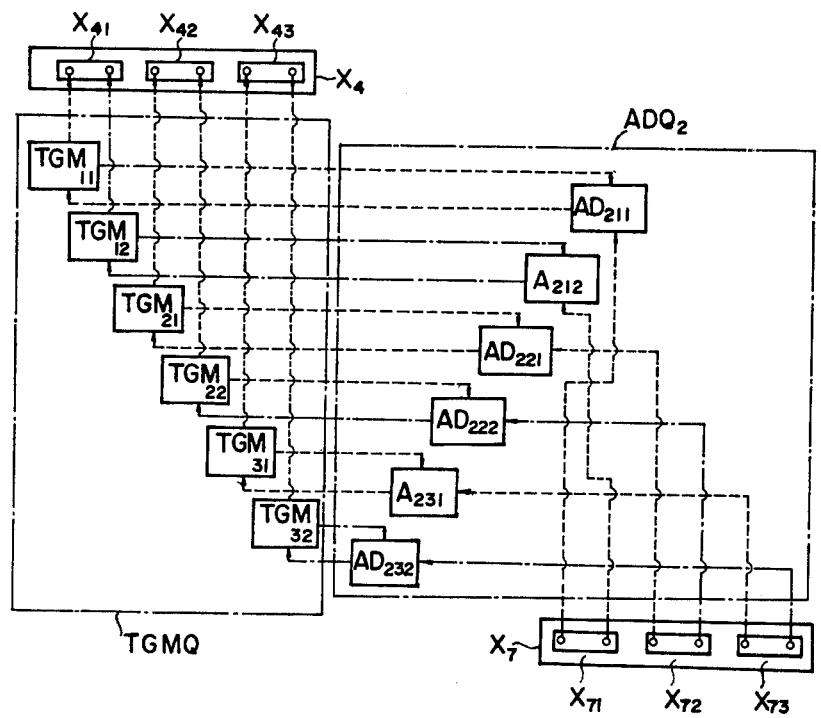
FIG. 14 is a detailed figure of separate type expression for complex number resister RQ.
Figure 15:
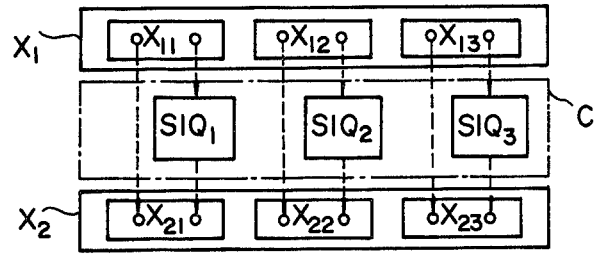
FIG. 15 is a detailed figure of separate type expression for complex conjugate generator C.
Figure 16:
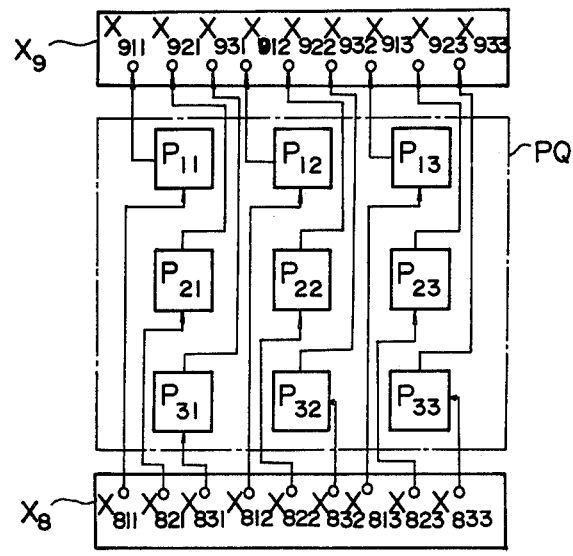
FIG. 16 is a detailed figure for complex number P resister PQ.
Figure 17:
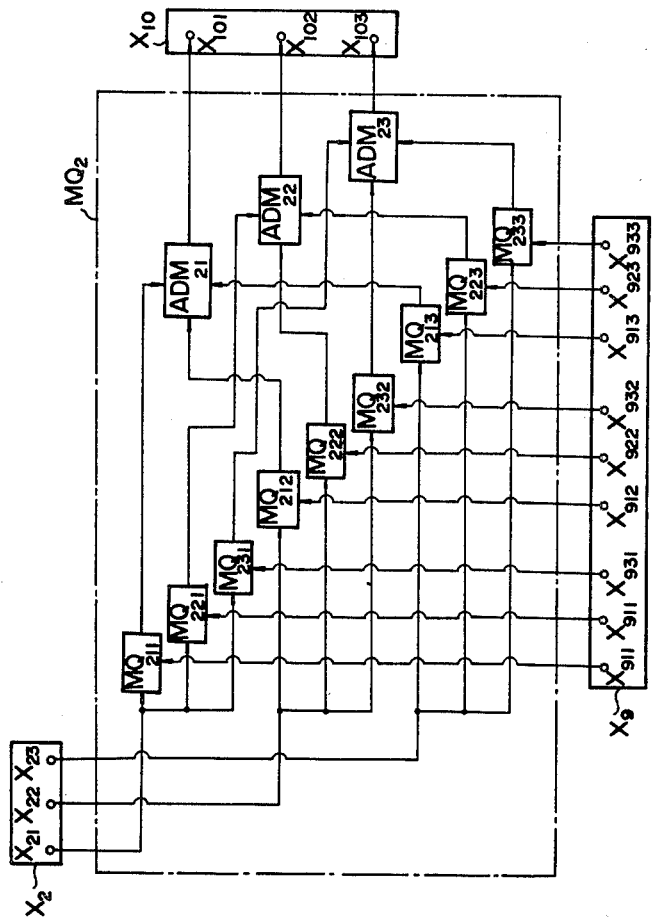
FIG. 17 is a detailed figure for complex number multiplier MQ$_2$.
Figure 18:
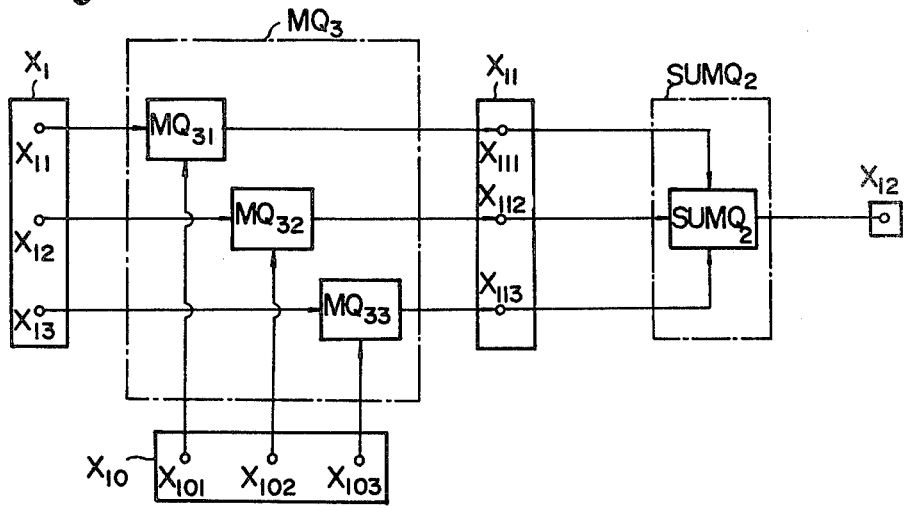
FIG. 18 is a detailed figure for combined portion of complex number multiplier MQ$_3$ and complex number concentrator SUMQ$_2$.
Figure 19:
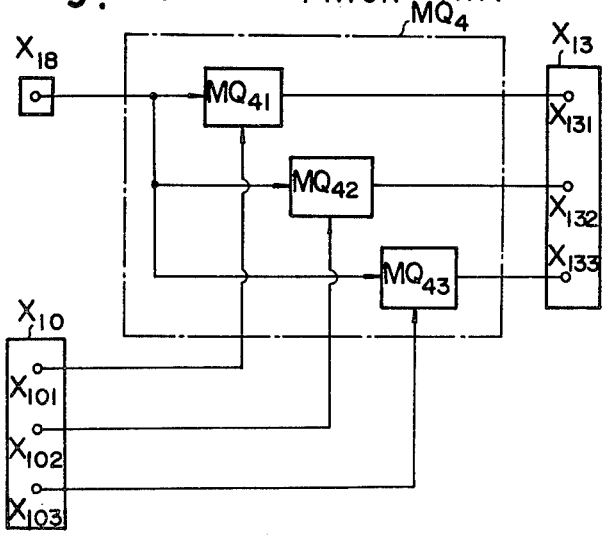
FIG. 19 is a detailed figure for complex number multiplier MQ$_4$.
Figure 20:
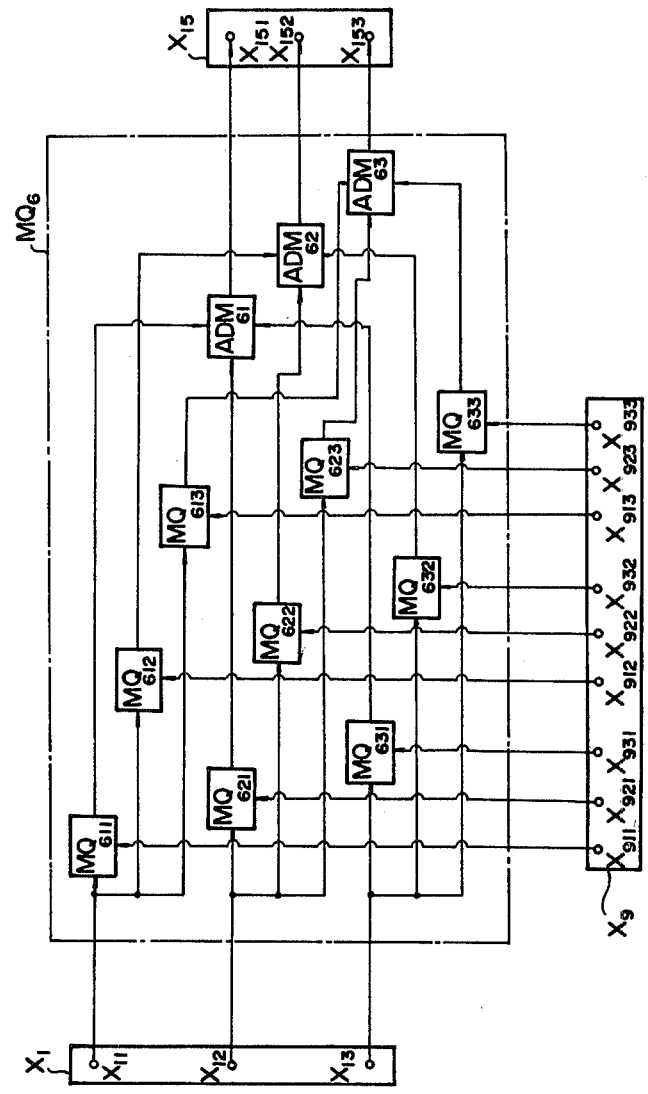
FIG. 20 is a detailed figure for complex number multiplier MQ$_6$.
Figure 21:
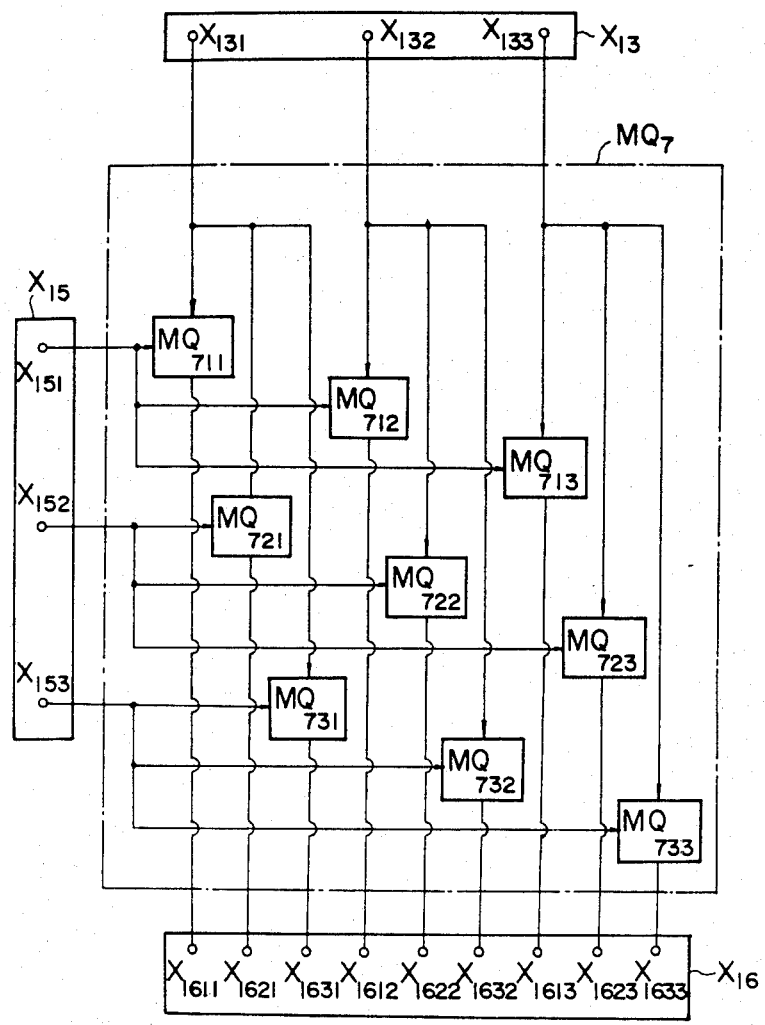
FIG. 21 is a detailed figure for complex number multiplier MQ$_7$.
Figures 22, 23:
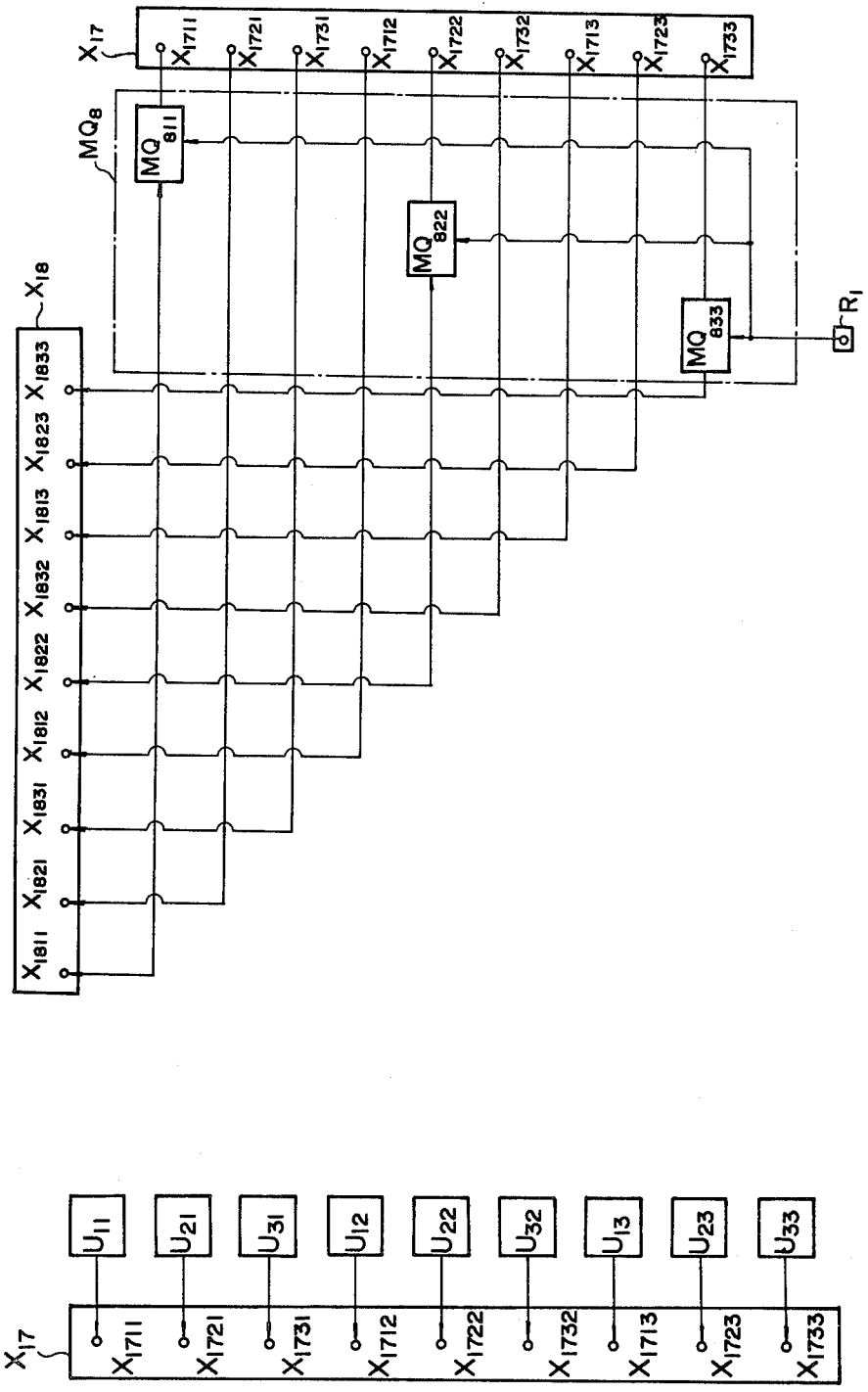
FIG. 22 is a detailed figure for unit matrix generator U.
FIG. 23 is a detailed figure for complex number multiplier MQ$_8$.

The more detailed composition of the system shown in FIG. 8 is illustrated in the succession of figures beginning with FIG. 9. Here, the case where M which is tap number of the tapped delay lines $TDLQ_1$ and $TDLQ_2$ is restricted to 3 is dealt with from reason of simplicity of explanation. Nevertheless M can be chosen arbitrary and so composition shown here does not limit the arbitrariness of M. FIG. 9 is detailed figure of compound type expression of complex number tapped delay lines $TDLQ_1$ and $TDLQ_2$. Points $X_3$ and $X_1$ are composed of three points respectively and component points of $X_3$ for example are called as $X_{31}$, $X_{32}$ and $X_{33}$ in the order of less delay as shown in FIG. 9. The term "compound type" means the description method in which real part and imaginary part which are composing elements of complex number are expressed lumped together. On the other hand the term "separate type" denotes the method where these elements are dealt with separately. On FIG. 9 a single lead carrying complex number is written in a real line and so each real line is consisted of two lines; namely, a real number line and an imaginary number line. Of course expression in FIG. 8 is of compound type. DLQ's in FIG. 9 represent unit delay element of T second for complex number. FIG. 10 handles the same part as in FIG. 9 with separate type expression. Here, dotted lines represent leads for real number and chain lines for imaginary number. This expression method is applied similarly to other figures. In FIG. 10, points $X_{31}$ and $X_{11}$, for example, are re-divided into two points respectively. The component shown as T is unit delay element of T second. Both of two illustration methods, compound type and separate type, will be used here to provide maximum clarity according to situations. $TDLQ_1$ and $TDLQ_2$, as easily recognized from FIG. 10, can be realized by shift resisters operating on T second clock. FIG. 11 shows the composition of complex number multiplier $MQ_1$ in compound type expression. At the detailed description of the component of the system KEQQ shown in FIG. 8, constituting points of $X_i$ (i is an integer) will be expressed either with $X_{ij}$ or with $X_{ijk}$ (i, j and k are integers and j and k take values between 1 to M where M is 3) sub-subscripts being used. The mutual positional relations among these points are kept the same over these figures. $MQ_1$'s ($i=1, 2, 3$) which comprise $MQ_1$ can be expressed by unit complex number multipliers. $MQ_{11}$, for example, can be expressed as shown in FIG. 12. $M_{111}$ through $M_{114}$, $ADA_{11}$ and $ADA_{12}$ and $SIM_{11}$ in FIG. 12 are unit multipliers for real number, ordinary unit adders for real number and ordinary sign inverter for real number respectively. These parts can be realized through the use of the hardwares similar to the component of widely used electronic calculators. FIG. 13 is description of complex number concentrator $SUMQ_1$ by separate type expression. $ADAS_{11}$ and $ADAS_{12}$ are ordinary adders for real number. FIG. 14 shows section comprised with complex number adder $ADQ_2$ and complex number tap gain memory $TGMQ$ or the section of complex number resister $RQ$ with separate type expression. $ADA_{211}$ through $ADA_{232}$ and $TGM_{11}$ through $TGM_{32}$ are unit adders and RAM (Random Access Memory) for one character respectively. FIG. 15 represents composition of complex conjugate generator C in separate type expression. $SIQ_1$ through $SIQ_3$ are unit sign inverters. For the purpose of providing understanding of processing for complex number and showing the situations in complex algebra in actual operation, the operations using real number decomposition have been shown. FIG. 10 shows delay operation using decomposition into real number as compared to complex number operation shown in FIG. 9 and FIG. 12 gives the multiplication under the way of real number decomposition contrasting complex number operation in FIG. 11 and FIG. 13 shows the method of complex number addition using real number decomposition. Furthermore FIG. 14 shows denoting method of complex number and FIG. 15 depicts generation of complex conjugate value by the real number decomposition. As the operation methods for complex number seems to be sufficiently described, the detailed illustration of the composing parts in FIG. 8 will henceforth be given under compound type expression for the purpose of clarity of description. FIG. 16 is figure for complex number P resister PQ. $P_{11}$ through $P_{33}$ are composed by RAM's and store corresponding complex elements in matrix $P_k$. FIG. 17 is minute description of complex number multiplier $MQ_2$ in compound type expression. $MQ_2$ is, as formerly seen, the part where multiplication between $3 \times 3$ matrix $P_k$ and vector $x_k$ of dimension 3 is conducted generating vector $P_k \bar{x}_k$ of dimension 3. $MQ_{211}$ through $MQ_{233}$ here are complex multipliers shown in FIG. 12. $ADM_{21}$, $ADM_{22}$ and $ADM_{23}$ are complex number adders. FIG. 18 depicts composition concerning $MQ_3$ and $SUM_2$. $MQ_{31}$, $MQ_{32}$ and $MQ_{33}$ are complex number multipliers and $SUMQ_2$ is comprised of only one adder $SUMQ_2$. As complex adder can be realized by unit complex number adder and invertor which provides inversion of positive real value can be materialized by the hardware similar to the ones used in electronic calculator conducting inverse operation, further explanation will be curtailed here. Complex number multiplier $MQ_4$ is expressed as shown in FIG. 19. $MQ_{41}$ through $MQ_{43}$ here are unit complex number multipliers. $MQ_5$ takes the same configuration as that of $MQ_4$, where $X_{14}$ corresponds to $X_{12}$ and $X_{10}$ to $X_{13}$ and $X_{13}$ to $X_7$. FIG. 20 is detailed expression of complex number multiplier $MQ_6$. $MQ_{611}$ through $MQ_{633}$ and $ADM_{61}$ through $ADM_{63}$ are complex number multipliers and complex number adders respectively. FIG. 21 is the figure of complex number multiplier $MQ_7$. $MQ_{711}$ through $MQ_{733}$ are complex number multipliers. The detailed figure for complex number sign inverter SIQ is omitted because of self evidence of the operation. Complex number adders $ADQ_4$ and $ADQ_5$ can be composed of by nine pieces of unit complex number adders respectively and explanation is skipped for the reason of obviousness. Unit matrix generator U can be constructed as shown in FIG. 22. $U_{11}$ through $U_{33}$ which are one character memories can be comprised with ROM(Read Only Memory)'s with $U_{11}$, $U_{22}$ and $U_{33}$ producing 1's and other parts producing 0's. Complex number multiplier $MQ_8$ takes the shape shown in FIG. 23. $MQ_{811}$, $MQ_{822}$ and $MQ_{833}$ can be composed of complex number multipliers. These are detailed explanations for the composing parts of the system in FIG. 8 which is complex number Kalman equalizer KEQQ and it is easily understandable that all the components can be realized by already known hardwares. Real number Kalman equalizer KEQA depicted in FIGS. 5 and 6 and used for AM modulation system can handle only real number symbol and, as a result of the fact that coefficients included in the KEQA are of real number value, can operate only when the impulse response of the equivalent base band transmission line has real impulse response. Complex number Kalman equalizer KEQQ for QAM modulation, on the other hand, can operate even when both of or either of above mentioned two kinds of values are not of real numbers and can provide inverse circuit of complex number equivalent transmission line ETRLQ.

Figure 24:
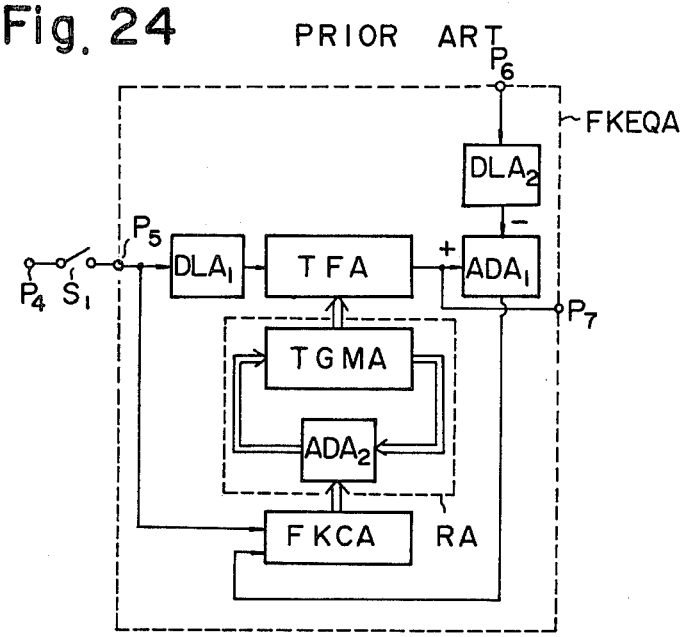
FIG. 24 is a block diagram for real number fast Kalman equalizer.
Figure 25:
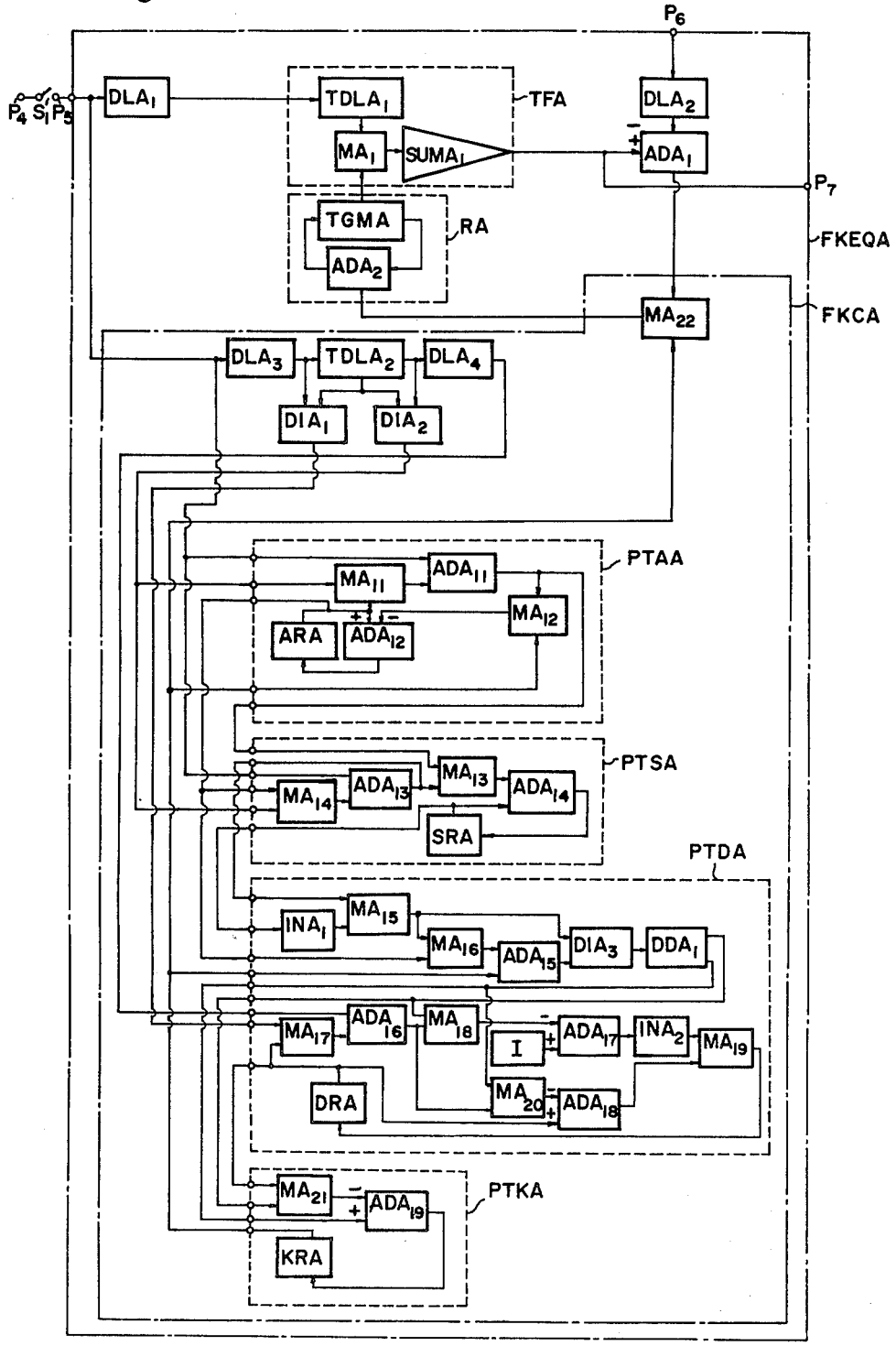
FIG. 25 is a detailed figure for real number fast Kalman equalizer.

Next, widely known theories concerning fast Kalman equalizer which is the other candidate for comprising real number equalizer will be shown. This type of equalizer serves as a basis of complex number fast Kalman equalizer which composes a part of this invention. The result of dividing the equalizer which is called as FKEQA into fairly large sections is shown in FIG. 24. This can be used as real number automatic equalizer EQA shown in FIGS. 1 and 2. FKCA in FIG. 24 indicates real number fast Kalman controller. $DLA_1$ and $DLA_2$ are real number delay elements with delay of T second. The other composing parts are the same as those in real number Kalman equalizer KEQA shown in FIG. 5, namely TFA is real number transmission function and TGMA is real number tap gain memory and $ADA_1$ and $ADA_2$ are real number adders. As is in FIG. 5, the part built by TGMA and $ADA_2$ is called real number resister RA. $P_4$, $P_5$, $P_6$ and $P_7$ are input point of sampler, input point of automatic equalizer, input point of reference signal and output point of automatic equalizer respectively and $S_1$ is sampler. Almost all situation remains same compared with that in FIG. 5 or real number Kalman equalizer KEQA. The difference between real number fast Kalman equalizer FKEQA in FIG. 24 and real number Kalman equalizer shown in FIG. 5 will be discussed now. FKEQA and KEQA have real number fast Kalman controller FKCA and real number Kalman controller KCA as controlling parts respectively and controllings are conducted through mutually very different theories of fast Kalman filter and Kalman filter respectively. Nevertheless, RA and TFA operate similarly. The other difference lies in that FKEQA has additional parts of real number delay elements $DLA_1$ and $DLA_2$. The real number delay element $DLA_1$ is introduced because of the fact that real number fast Kalman controller FKCA need, for its operation, input signal to real number transmission function TFA T second before the entering of the signal in TFA and $DLA_2$ is introduced to compensate the time difference between signal at equalizer output and reference signal appearing at point $P_6$. The difference is caused by introduction of DLA$_1$. The more detailed illustration of FKEQA shown in FIG. 24 is given in FIG. 25. Explanation according to FIG. 25 is now given. The portions dealt with in FIG. 24 remain the same in the figure. Multi leads which are expressed by double lines are henceforth, beginning with FIG. 24, expressed by single lines for the sake of avoidance of complexity. Moderately minute sectioning is applied to the real number fast Kalman controller FKCA dividing it into parts of PTAA, PTSA, PTDA and PTkA which are, respectively, real number A resister controller, real number S resister controller, real number D resister controller and real number k resister controller. TDLA$_1$ is, as shown before, real number tapped delay line having M taps and TDLA$_2$, on the other hand, tapped delay line of M−1 taps. ARA, SRA, DRA and kRA are real number A resister, real number S resister, real number D resister and real number k resister respectively. MA$_1$ and MA$_{11}$ through MA$_{22}$ are real number multipliers. SUMA$_1$ is, as before, is real number concentrator. ADA$_1$, ADA$_2$ and ADA$_{11}$ through ADA$_{19}$ are real number adders. INA$_1$ and INA$_2$ are real number inverse value generators and I is unit number generator. DIA$_1$ and DIA$_2$ are real number dimension increaser. DLA$_3$ and DLA$_4$ are, like DLA$_1$ and DLA$_2$, real number delay elements.

Following is the description of operation of the real number fast Kalman equalizer FKEQA. First the operation of real number transmission function TFA and real number resister RA is dealt with. Real number tapped delay line TDLA$_1$ provides, under the influence of DLA$_1$, input vector $x_k$ defined by following Eq. (9), where $g_k$ is given as input signal appearing at the point P$_5$ at the k'th time slot (k is of course time variable with integer value).

$$x_k = \begin{bmatrix} g_{k-1} \\ g_{k-2} \\ \cdot \\ \cdot \\ \cdot \\ g_{k-M} \end{bmatrix} \quad (9)$$

Real number tap gain memory TGMA stores tap gain vector $h_k$ of dimension M which is the state of this real number fast Kalman equalizer FKEQA. Real number multiplier MA$_1$ does multiplication between corresponding elements of $x_k$ and $h_k$ whereas real number concentrator SUMA$_1$ sums up the output signals from MA$_1$. As a consequence, MA$_1$ and SUMA$_1$, as a whole, conduct the operation of following Eq. (10) giving rise to scalar $\hat{y}_k$.

$$\hat{y}_k = x_k^T \hat{h}_k \quad (10)$$

The output signal of real number transmission function TFA is $y_k$ given in Eq. (10). Error signal $e_k$ of the real number fast Kalman equalizer FKEQA is given as difference between $\hat{y}_k$ and $y_k$. The difference appears at the output point of real number adder ADA$_1$ given by following Eq. (11).

$$e_k = y_k - \hat{y}_k \quad (11)$$

$y_k$ is reference signal entering from point P$_6$. As mentioned before, real number adders to which sign symbols + and − are attached function as subtractors which do subtraction according to the sign attached. Updating of $\hat{h}_k$ is conducted at real number adder ADA$_2$ making use of vector $k_k$ of dimension M which is output signal of real number k resister kRA and scalar value $e_k$ shown above. That is to say, incremental component of $\hat{h}_k$ which is $\Delta\hat{h}_k$ given in the following Eq. (12) and obtained at the output of MA$_{22}$ is used to obtain $\hat{h}_{k+1}$ which is the value of $\hat{h}_k$ at the next time slot and is given in following Eq. (13) and which appears as the output of ADA$_2$.

$$\Delta\hat{h}_k = k_k e_k \quad (12)$$

$$\hat{h}_{k+1} = \hat{h}_k + \Delta\hat{h}_k \quad (13)$$

The contents in real number k resister kRA which is $k_k$ is also updated at every time slot. These types of updatings occur at many places in the real number fast Kalman controller FKCA. Following is the explanation of these updatings. First, description of $k_k$ using its component elements is given for the convenience of explanation in following Eq. (14).

$$k_k = \begin{bmatrix} k_{1k} \\ k_{2k} \\ \cdot \\ \cdot \\ \cdot \\ k_{Mk} \end{bmatrix} \quad (14)$$

From now on the operation of FKCA will be depicted according to the order of processing. This part admits input signal $g_k$ appearing at input point of automatic equalizer P$_5$ as its input and provides incremental information $\Delta\hat{h}_k$ of the stored value at the real number tap gain memory TGMA as its output. The signal at the input point of real number delay element DLA$_1$ is that at P$_5$ and is $g_k$. Output signal of real number tapped delay line TDLA$_2$ is M−1 dimensional vector and is expressed by:

$$u_k = \begin{bmatrix} g_{k-1} \\ g_{k-2} \\ \cdot \\ \cdot \\ \cdot \\ g_{k-(M-1)} \end{bmatrix} \quad (15)$$

Output of real number delay unit DLA$_4$ is apparently $g_{k-M}$. The value $g_{k-1}$ which is earlier by one time slot compared to presently incoming signal $g_k$ is needed at DLA$_1$ in FKCA. As formerly explained DLA$_1$ and DLA$_2$ are used for the purpose of time adjustment. $g_k$ and $u_k$ are introduced into real number dimension increaser DIA$_1$ and similarly $u_k$ and $g_{k-1}$ into dimension increaser DIA$_2$. DIA$_1$ provides vector $c_{k+1}$ having dimension larger by amount of one than that of $u_k$. Output vector of real number tapped delay line TDLA$_1$ which is $x_k$ is expressed by Eq. (9). $x_{k+1}$ is the state of $x_k$ later by one time slot which is of course expressed as:

$$x_{k+1} = \begin{bmatrix} g_k \\ g_{k-1} \\ \cdot \\ \cdot \\ \cdot \\ g_{k-(M-1)} \end{bmatrix} \quad (16)$$

Output of real number dimension increaser DIA$_2$ is $x_k$ given in Eq. (9). Using these $g_k$, $x_{k+1}$, $x_k$, $g_{k-M}$ and $e_k$ which is output of ADA$_1$, PTAA, PTSA, PTDA and PTkA, which are real number A resister controller, real number S resister controller, real number D resister controller and real number k resister controller respectively, function. These parts conduct adjustment of the contents of real number A resister ARA, real number S resister SRA, real number D resister DRA and real number k resister kRA. Above mentioned controllers act their operation at the same order of mentioning them or at the top to bottom order of the configuration in FIG. 25. First, action of real number A resister controller PTAA will be shown. Input signals to the part are $g_k$ which is input signal to real number delay line DLA$_3$, $x_k$ which is output signal of real number dimension increaser DIA$_2$ and formerly mentioned $k_k$ which is output signal of real number k resister kRA. Real number A resister ARA, at this instance, stores $A_{k-1}$ which is value for former time slot. $A_{k-1}$ is vector with M dimension and given by:

$$x_{k+1} = \begin{bmatrix} A_{1,k-1} \\ \cdot \\ \cdot \\ \cdot \\ A_{M,k-1} \end{bmatrix} \quad (17)$$

By the use of real number multiplier MA$_{11}$ and real number adder ADA$_{11}$ and also signals of $A_{k-1}$, $x_k$ and $g_k$, scalar value $q_k$ expressed in following Eq. (18) is obtained.

$$q_k = g_k + A_{k-1} x_k \quad (18)$$

By means of real number multiplier MA$_{12}$, real number adder ADA$_{12}$ and using, as input signals, $k_k$ and $q_k$, $q_k$ being output of ADA$_{11}$, the content of real number A resister ARA which is of course $A_k$ is calculated by:

$$A_k = A_{k-1} - k_k q_k^T \quad (18)'$$

This value is introduced into ARA completing the update. After this instant ARA will give the value of $A_k$. This is the action of real number A resister PTAA.

Real number S resister controller PTSA is analyzed next. The input signals for this part are $q_k$ which is output of real number adder ADA$_{11}$, $A_k$ which is output of real number A resister ARA, $g_k$ which is input signal to real number delay element DLA$_3$ and $x_k$ which is output of real number dimension increaser DIA$_2$. Employing real number multiplier MA$_{14}$ and real number adder ADA$_{13}$, the value $v_k$, a scalar, is produced at the output of ADA$_{13}$. $v_k$ is given by:

$$v_k = g_k + A_k^T x_k \quad (19)$$

At real number multiplier MA$_{13}$ and real number adder ADA$_{14}$, $S_k$ is calculated and content of S resister SRA is updated from $S_{k-1}$ to $S_k$, where $S_k$ is storage of SRA for next time slot. $S_k$ is given by:

$$S_k = S_{k-1} + v_k q_k \quad (20)$$

The operation of real number S resister controller has been thus explained.

Next, operation of real number D resister controller will be shown. The input signals for this part are $v_k$ which is output of real number adder ADA$_{13}$, $S_k$ which is output of real number S resister SRA, $A_k$ which is output of real number A resister ARA, $k_k$ which is output of real number k resister kRA, $g_{k-M}$ which is output of real number delay element DLA$_4$ and $x_{k+1}$ which is output of real number dimension increaser DIA$_1$. Apart from these signals, output of unit number generator I must be used. Utilizing real number inverse value generator INA$_1$ which generates inverse value of its input and real number multiplier MA$_5$, scalar value $S_k^{-1} v_k$ is generated as output of MA$_5$. $S_k^{-1}$ is inverse value of $S_k$. Real number multiplier MA$_{16}$ will do the multiplication of $A_k$ and $S_k^{-1}$ providing $A_k S_k^{-1} v_k$ as its output. This value is of M dimension from the fact that $A_k$ is a vector of M dimension. At real number adder ADA$_{15}$, the sum of $A_k S_k^{-1} v_k$ and $k_k$, where $k_k$ is output of real number k resister kRA, is calculated. The output of adder ADA$_{15}$ is consequently $k_k + A_k S_k^{-1} v_k$ which is vector of dimension M. Real number dimension increaser DIA$_3$ provides vector of dimension M+1 which is composed by arranging vector $k_k + A_k S_k^{-1} v_k$ of dimension M under the scalar $S_k^{-1} v_k$. The situation can be written as shown in following Eq. (21).

$$f_k = \begin{bmatrix} S_k^{-1} v_k \\ k_k + A_k S_k^{-1} v_k \end{bmatrix} = \begin{bmatrix} f_{1,k} \\ f_{2,k} \\ \cdot \\ \cdot \\ \cdot \\ f_{M+1,k} \end{bmatrix} \quad (21)$$

$f_k$ in Eq. (21) will be produced at the output of DIA$_3$. At real number dimension decreaser DDA$_1$, $f_k$ is divided into two components one of which is $m_k$ of M dimension and the other of which is scalar $w_k$. These are written as:

$$m_k = \begin{bmatrix} f_{1,k} \\ f_{2,k} \\ \cdot \\ \cdot \\ \cdot \\ f_{M,k} \end{bmatrix} \quad (22)$$

$$w_k = f_{M+1,k} \quad (23)$$

At this instant real number D resister DRA stores M dimensional vector $D_{k-1}$ which is value for former time slot. $D_{k-1}$, $X_{k+1}$ which is output of real number dimension increaser DIA$_1$ and $g_{k-M}$ which is output of real number delay element DLA$_4$ will be used at real number multiplier MA$_{17}$ and real number adder ADA$_{16}$ giving rise to a scalar r$_k$ given in following Eq. (24).

$$r_k = g_{k-M} + D_{k-1}^T x_{k+1} \qquad (24)$$

From D$_{k-1}$ which is output of DRA, m$_k$ which is output of DDA$_1$ and r$_k$ which is output of ADA$_{16}$, D$_{k-1}$−m$_k$r$_k$ is obtained as an output of ADA$_{18}$ through the operation of real number multiplier MA$_{20}$ and real number adder ADA$_{18}$. Furthermore, based on unit value which is output of unit value generator I, r$_k$ which is output of ADA$_{16}$ and w$_k$ which is output of DDA$_1$, the value [1−r$_k$w$_k$]$^{-1}$ is obtained as output of real number inverse value generator INA$_2$ through the effect of real number multiplier MA$_{18}$, real number adder ADA$_{17}$ and INA$_2$. INA$_2$ provides, like INA$_1$, the inverse value of its input at its output. The result of multiplication of [D$_{k-1}$−m$_k$r$_k$] and [1−r$_k$w$_k$]$^{-1}$ is obtained at the output of real number multiplier MA$_{19}$. The result is introduced into real number D resister DRA as the new value of DRA which is D$_k$ updating DRA. This process is expressed by:

$$D_k = [D_{k-1} - m_k r_k^T][1 - w_k r_k]^{-1} \qquad (25)$$

Following is operation of real number k resister controller PTkA. The input signals for this component are D$_k$ which is output signal of real number D resister DRA, w$_k$ which is output signal of real number dimension decreaser DDA$_1$ and m$_k$ which also comes from DDA$_1$. As a result of operations in real number multiplier MA$_{21}$ and real number adder ADA$_{19}$, the operation given in following Eq. (26) is done producing k$_{k+1}$ which is storage of real number k resister for next time slot.

$$k_{k+1} = m_k - D_k w_k \qquad (26)$$

k$_k$ given in Eq. (14) is M dimensional vector. Real number k resister kRA is now updated and the system of real number fast Kalman equalizer FKEQA waits for the input g$_{k+1}$ of the next time slot.

Now the illustration of operation for the real number fast Kalman equalizer FKEQA which is widely known is completed. Succeeding widely known technic of real number fast Kalman equalizer mentioned above, the technic of complex number fast Kalman equalizer which consists considerable part of this invention will now be explained. This technic can be used to equalize complex number equivalent base band transmission line ETRLQ shown in FIGS. 3 and 4 and constitutes the basis of bandwidth division fast Kalman equalizer shown afterward. The figure for complex number fast Kalman equalizer FKEQQ with sectioning into fairly large sections is FIG. 26. The composition is very similar in its shape to the real number fast Kalman equalizer FKEQA given in FIG. 24.

Figure 26:
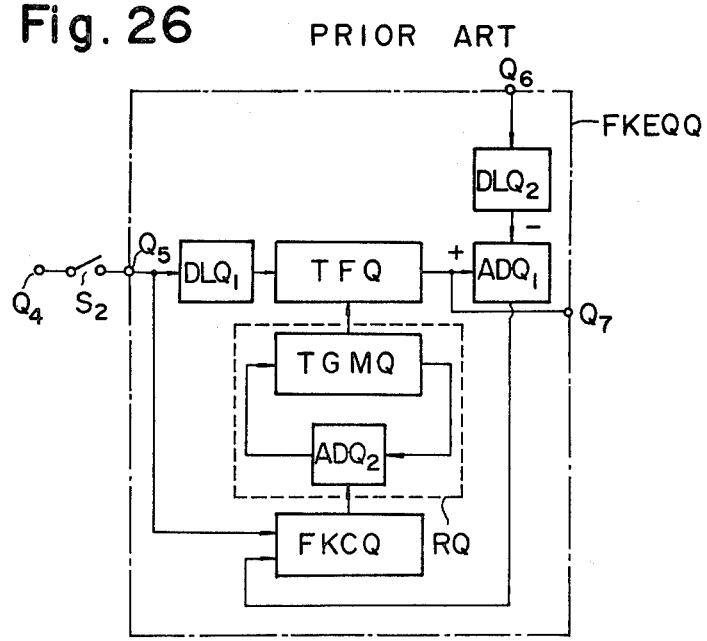
FIG. 26 is a block diagram for complex number fast Kalman equalizer.
Figure 27:
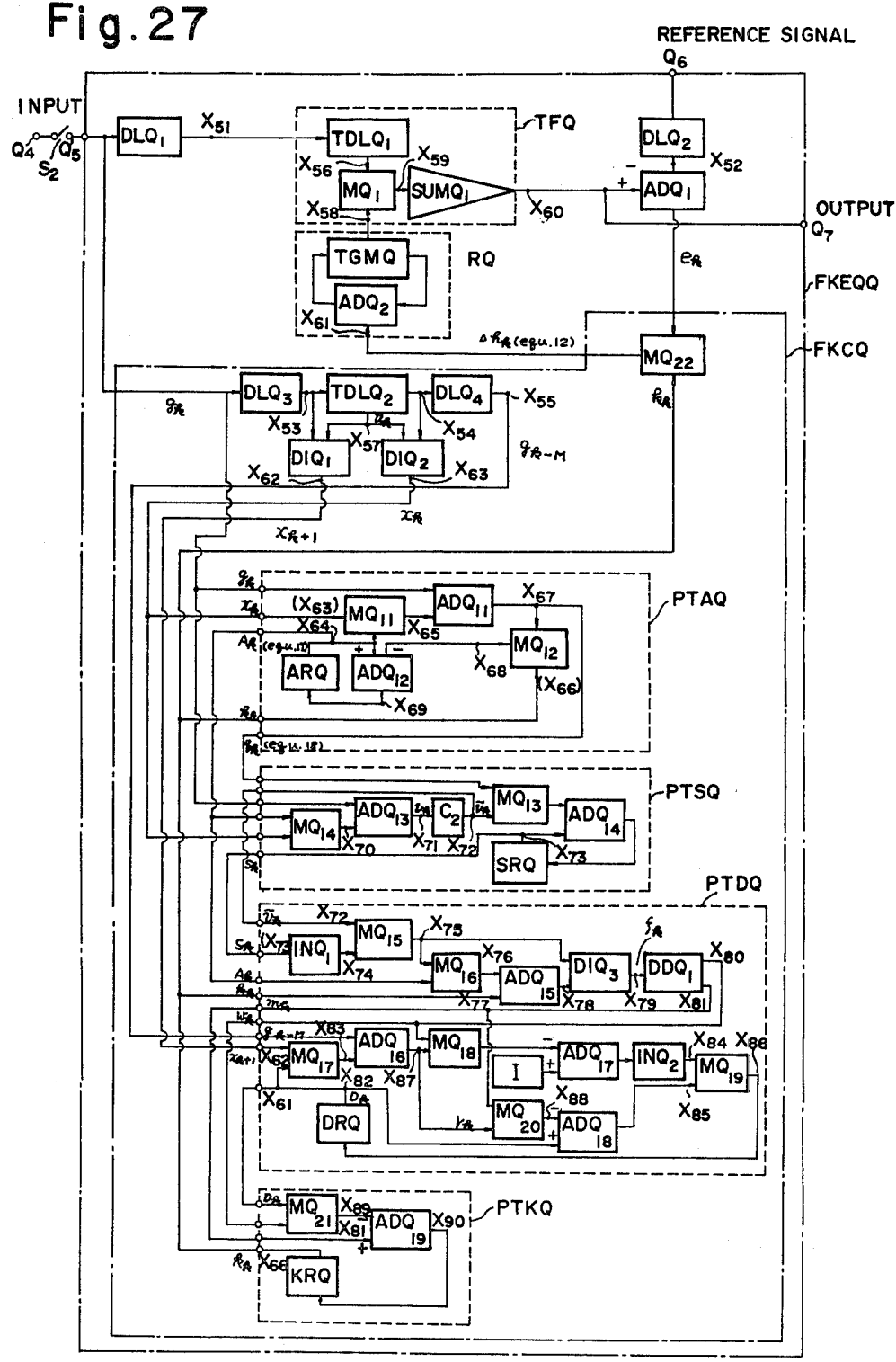
FIG. 27 is a detailed figure for complex number fast Kalman equalizer.

The complex number fast Kalman equalizer can be utilized, like complex number Kalman equalizer KEQQ formerly explained, as complex number equalizer EQQ shown in FIGS. 3 and 4 and can equalize complex number equivalent base band transmission line ETRLQ, whereas real number fast Kalman equalizer FKEQA is restricted in its use to the action of real number equalizer EQA shown in FIGS. 1 and 2. At FIG. 26 of FKEQQ, FKCQ is complex number fast Kalman controller. DLQ$_1$ and DLQ$_2$ are complex number delay elements with T second of delay. Other composing parts remain the same as those in complex number Kalman equalizer KEQQ shown in FIG. 7. Henceforth TFQ is complex number transmission function and TGMQ is complex number tap gain memory, and finally ADQ$_1$ and ADQ$_2$ are complex number adders. As is in FIG. 7, GMQ and ADQ$_2$ lumped in one component is called complex number resister RQ. Q$_4$, Q$_5$, Q$_6$ and Q$_7$ are input point of sampler, input point of automatic equalizer, input point of reference signal and output point of automatic equalizer respectively and S$_2$ is sampler. The situation that this equalizer can be utilized as complex number equalizer EQQ shown in FIGS. 3 and 4 is unchanged as is situation of complex number Kalman equalizer KEQQ. The difference between complex number fast Kalman equalizer FKEQQ shown in FIG. 26 and complex number Kalman equalizer KEQQ shown in FIG. 7 lies in that the former operates under the theory of fast Kalman filter making use of complex number fast Kalman controller FKCQ whereas the latter under theory of Kalman filter making use of complex number Kalman controller KCQ. The difference is the same as that between real number fast Kalman equalizer FKEQA and real number Kalman equalizer KEQA. On the other hand, the difference between real number fast Kalman equalizer FKEQA and complex number fast Kalman equalizer FKEQQ explained here, is that the latter uses theory of fast Kalman filter extended to the region of complex number. This expansion is given originally at this invention. The role of complex number delay elements DLQ$_1$ and DLQ$_2$ is the same as that of real number delay elements DLA$_1$ and DLA$_2$ in the case of real number fast Kalman equalizer FKEQA in FIG. 24 and henceforth explanation will not be repeated. The more detailed configuration of FIG. 26 is given in FIG. 27. Henceforth study of each composing part and its function is made following FIG. 27. In FIG. 27, components already shown in FIG. 26 of course remain the same. Also for complex number Kalman controller FKCQ, middle scale division is applied resulting in the sectioning into PTAQ, PTSQ, PTDQ and PTkQ which are, respectively, complex number A resister controller, complex number S resister controller, complex number D resister controller and complex number k resister controller. TDLQ$_1$ is complex number tapped delay line of M taps whereas TDLQ$_2$ is complex number tapped delay line M−1 taps. ARQ, SRQ, DRQ, and kRQ are complex number A resister, complex number S resister, complex number D resister and complex number k resister respectively. MQ$_1$ and MQ$_{11}$ through MQ$_{22}$ are complex number multipliers and SUMQ$_1$ is complex number concentrator. ADQ$_1$, ADQ$_2$ and ADQ$_{11}$ through ADQ$_{19}$ are all complex number adders. INQ$_1$ and INQ$_2$ are complex number inverse value generators. I is as before unit value generator. DIQ$_1$ and DIQ$_2$ are complex number dimension increasers and DDQ$_1$ is complex number dimension decreaser. DLQ$_3$ and DLQ$_4$ are, like DLQ$_1$ and DLQ$_2$, complex number delay elements. Each constituting part at FIGS. 26 and 27 corresponds to that in FIGS. 24 and 25 which have the same names except that the last letter is changed from Q to A doing nearly the same operation. One major and vital change is that complex conjugate generator C$_2$ connected directly after the output port of ADQ$_{13}$ in FIG. 27 is newly implemented. This component of course provides complex conjugate value of its input at its output. Because of existence of this component the operation of the system at FIG. 27 which is complex number fast Kalman equalizer FKEQQ becomes different from that of FKEQA in FIG. 25. The processing action of complex number fast Kalman equalizer FKEQQ is the same as that of real number fast Kalman equalizer FKEQA except the operation around a variable $v_k$. The operations of components parts of KKEQQ are the same as those of corresponding parts of FKEQA except that $v_k$ must be changed to $\tilde{v}_k$ and the last letters at the abbreviated names of parts must be changed from A to Q and the term "real number" must be changed to "complex number" at their full names. Henceforth further explanation of operation at each component is curtailed here. Nevertheless illustration of action at complex number S resister controller PTSQ after generation of $v_k$ at the output of $ADQ_{13}$ must be added and following description must be given. Owing to the operation at complex number multiplier $MQ_4$ and complex number adder $ADQ_{13}$, the scalar value $v_k$ is produced at the output point of $MDQ_{13}$. This operation is expressed by following Eq. (19).

$$v_k = g_k + A_k^T x_k \qquad (19)$$

This value $v_k$ is directly led to the complex conjugate generator $C_2$ and $\tilde{v}_k$ is obtained at its output point. The symbol $\sim$ used here is of course complex conjugate symbol. Next, through the cooperation of complex number multiplier $MQ_{13}$ and complex number adder $ADQ_{14}$, the value $S_k$ is calculated as shown in following Eq. (20)' and accordingly the storage of complex number S resister SRQ is changed from $S_{k-1}$ to $S_k$ which is storage of this k'th time slot.

$$S_k = S_{k-1} + \tilde{v}_k q_k \qquad (20)'$$

This is operation of complex number S resister controller PTSQ. Equations for FKEQQ remain unchanged in their expressions from these for KEQQ except that Eq. (20) must be replaced by Eq. (20)' and Eq. (21) by following Eq. (21)'.

$$f_k = \begin{bmatrix} S_k^{-1} \tilde{v}_k \\ k_k + A_k S_k^{-1} \tilde{v}_k \end{bmatrix} = \begin{bmatrix} f_{1,k} \\ f_{2,k} \\ \cdot \\ \cdot \\ \cdot \\ f_{M+1,k} \end{bmatrix} \qquad (21)'$$

Equations (9) through (19) and (22) through (26) begin to deal with complex numbers. Superficial difference between systems in FIG. 25 which is FKEQA and that in FIG. 27 which is FKEQQ is limited only to the existence of complex conjugate generator $C_2$ but latent and large difference occurs in that system in FIG. 27 can handle complex number whereas the system in FIG. 25 can only deal with real number. Complex number fast Kalman equalizer FKEQQ has much expanded its application area to, for example, utilization as complex number EQQ in FIGS. 3 and 4 contrasting to the area for the system in FIG. 25. Detailed expression of the composing parts in FIG. 27 will be shown at the figures beginning with FIG. 28. Here again the case in which tap number for complex number tapped delay line TDLQ$_1$ is 3 is shown but the configurations in these figures do not restrict the arbitrariness of the number of M. At FIG. 27 points $X_{51}$ through $X_{90}$ are defined.

Figure 28:
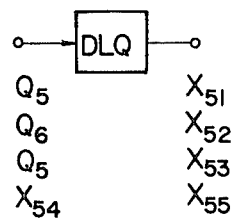
FIG. 28 is a detailed figure for complex number delay elements DLQ$_1$ through DLQ$_4$.

These letters are used to show the relations between FIG. 27 and figures beginning with FIG. 28.

Figure 29:
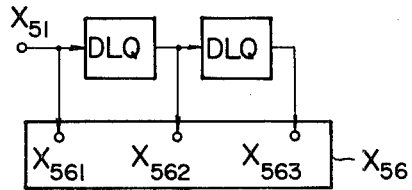
FIG. 29 is a detailed figure for complex number tapped delay line $TDLQ_1$.
Figure 30:
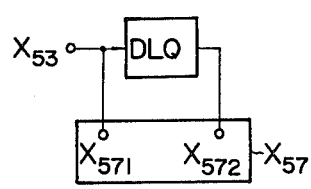
FIG. 30 is a detailed figure for complex number tapped delay line $TDLQ_2$.
Figure 31:
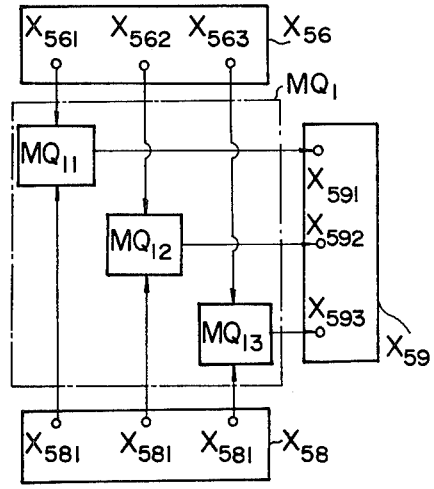
FIG. 31 is a detailed figure for complex number multiplier $MQ_1$.
Figure 32:
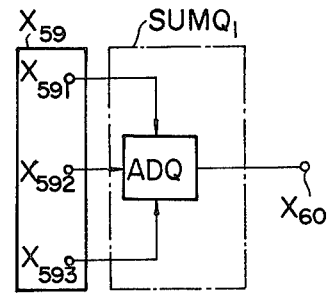
FIG. 32 is a detailed figure for complex number concentrator $SUMQ_1$.
Figure 33:
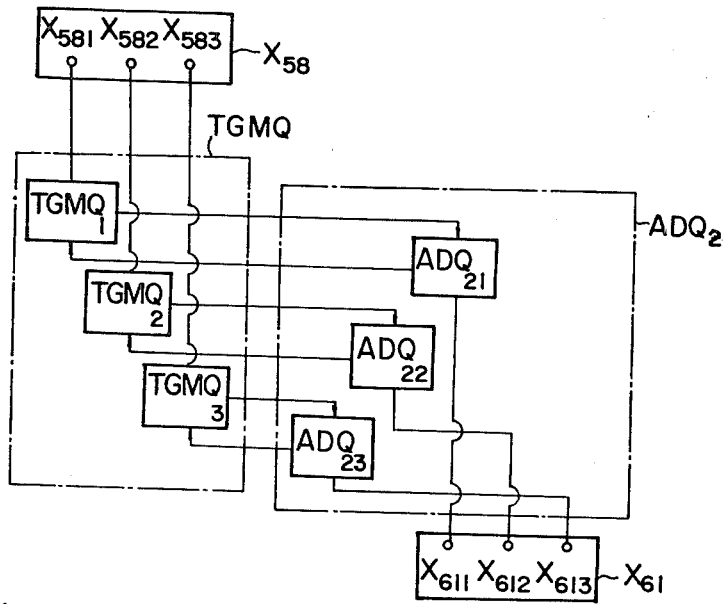
FIG. 33 is a detailed figure for complex number resister RQ.
Figures 34, 35:
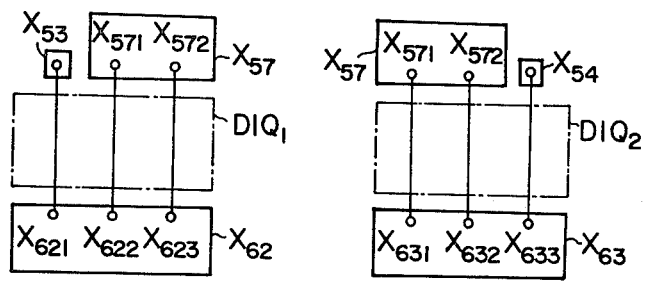
FIG. 34 is a detailed figure for complex number dimension increaser $DIQ_1$.
FIG. 35 is a detailed figure for complex number dimension increaser $DIQ_2$.

FIG. 28 is detailed description of complex number delay elements DLQ$_1$ through DLQ$_4$ in expression of compound type. This figure coincides with that of unit complex number delay element as a whole. As explained before, compound type of expression is the way in which real number part and imaginary number part of complex number is dealt with lumped together whereas separate type of expression is the method where these parts are handled separately. Like expression in former examples leads carrying complex number are denoted by single line in the compound cases and leads carrying real number and lead carrying imaginary number are expressed by dotted lines and chain lines respectively in the separate cases. DLQ's in FIG. 28 are complex number delay elements with T second delay. As apparent from FIG. 28 DLQ$_1$ through DLQ$_4$ can be realized by shift resisters operating on T second clock. FIG. 29 consists the detailed figure of complex number tapped delay line TDLQ$_1$ by the expression of compound type. Point $X_{56}$ is consisted of three points as a result of tap number M being 3. These points are called as $X_{561}$, $X_{562}$ and $X_{563}$ and arranged as shown in the figure by the order of less delay. For DLQ's description has been made concerning complex number delay elements DLQ through DLQ$_4$. FIG. 30 is minute expression of compound type for the complex number tapped delay line TDLQ$_2$. $X_{57}$ is consisted of two points which are called $X_{571}$ and $X_{572}$ by the order of less delay as shown in the figure. FIG. 31 shows the composition of complex number multiplier MQ$_1$ with compound type of expression. MQ$_{11}$ through MQ$_{13}$ in the figure are unit complex number multipliers. It is apparent that each MQ$_{1i}$'s (i=1, 2, 3) can be expressed by the configuration shown in FIG. 12 when separate type of expression is used. FIG. 32 is minute figure of complex number concentrator SUMQ$_1$ in compound type of expression. ADQ is complex number adder admitting three input signals. FIG. 33 is compound expression of both of complex number adder ADQ$_2$ and complex number tap gain memory TGMQ which are lumped together to be complex number resister RQ. Difference of the two types of expression is quite apparent when FIG. 33 is compared with FIG. 14 which uses separate type of expression. ADQ$_{21}$ through ADQ$_{23}$ in FIG. 33 are unit complex number adders. TGMQ$_1$ through TGMQ$_3$ can be realized by complex number memories of one character. Complex number adder ADQ$_1$ can be constructed with scalar adders hence explanation for these parts is omitted because of self evidence. FIGS. 34 and 35 are for minute expression in compound type of complex number dimension increaser DIQ$_1$ and DIQ$_2$ respectively. These are composed only of wirings between their terminals.

Figure 36:
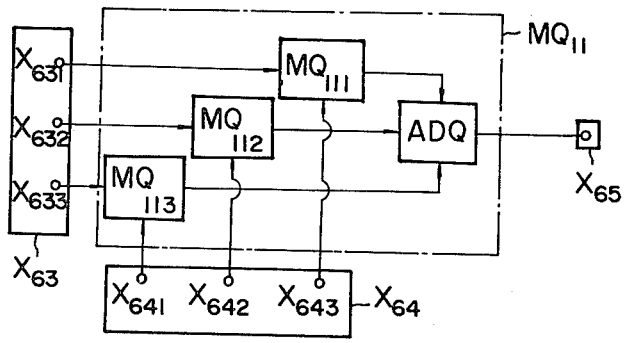
FIG. 36 is a detailed figure for complex number multiplier $MQ_{11}$.
Figure 37:
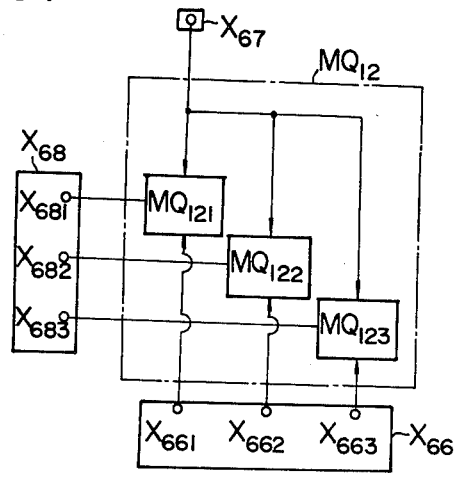
FIG. 37 is a detailed figure for complex number multiplier $MQ_{12}$.
Figure 38:
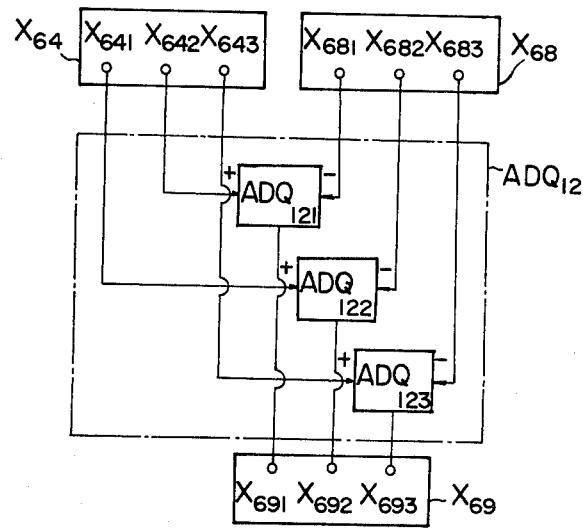
FIG. 38 is a detailed figure for complex number adder $ADQ_{12}$.
Figure 39:
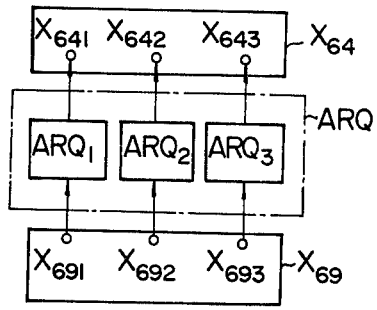
FIG. 39 is a detailed figure for complex number A resister ARQ.

Next, detailed figures for consisting part of complex number A resister controller PTAQ will be treated. FIG. 36 is detailed description, in compound type of expression, of complex number multiplier MQ$_{11}$. MQ$_{111}$ through MQ$_{113}$ in this figure are, respectively, consisted of single complex number multiplier whereas ADQ is complex number adder with three input terminals. ADQ$_{11}$ is scalar adder to which explanation is curtailed for the reason of simplicity. FIG. 37 is minute figure for complex number multiplier MQ$_{12}$ in compound type of expression. MQ$_{121}$ through MQ$_{123}$ are made from single complex multipliers respectively. FIG. 38 is detailed compound type expression of complex number adder ADQ$_{12}$. This component is consisted of three single complex number adders ADQ$_{121}$ through ADQ$_{123}$. These, as mentioned before, conduct subtraction by addition using sign inversions of signal treated according to + and − signs in the figure. The compound type expression of complex number A resister ARQ in detail is FIG. 39. This part is composed of three single complex number resisters ARQ$_1$ through ARQ$_3$. These above are descriptions of complex number A resister controller PTAQ.

Figure 40:
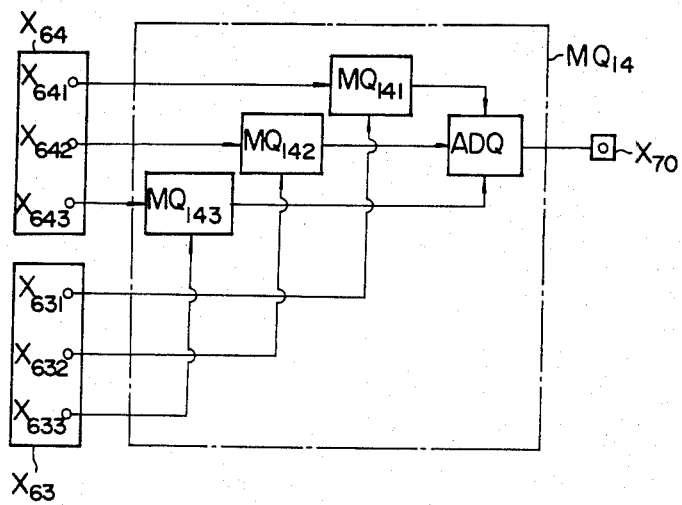
FIG. 40 is a detailed figure for complex number multiplier $MQ_{14}$.
Figure 41:
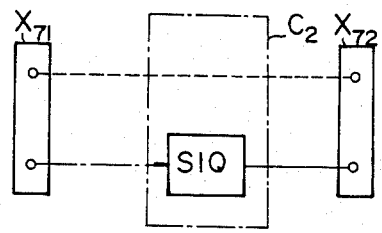
FIG. 41 is a detailed figure of separate type expression for complex conjugate generator $C_2$.
Figure 42:
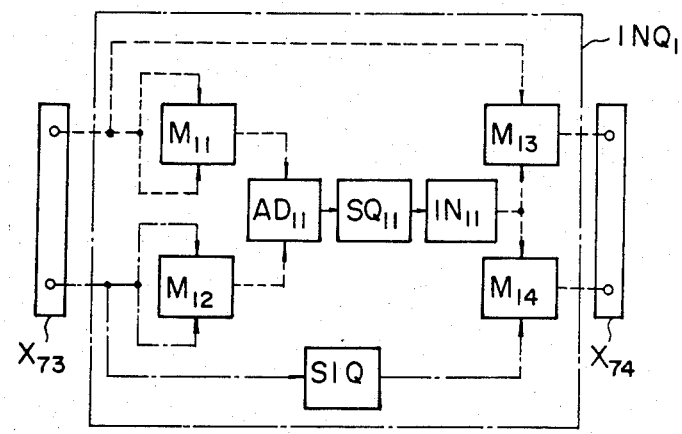
FIG. 42 is a detailed figure for complex number inverse value generator $INQ_1$.
Figure 43:
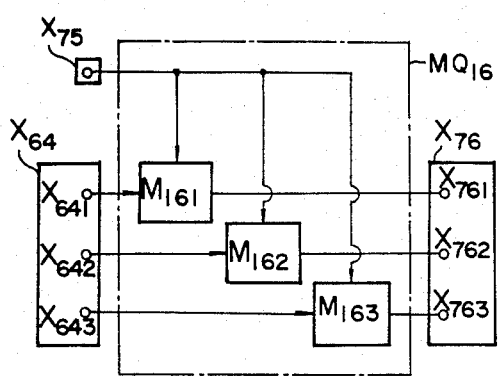
FIG. 43 is a detailed figure for complex number multiplier $MQ_{16}$.
Figure 46:
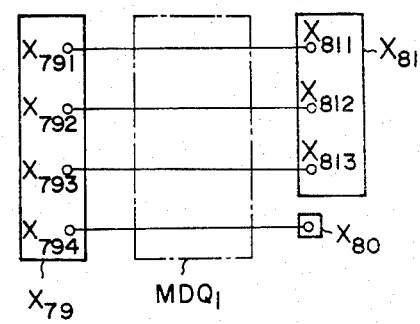
FIG. 46 is a detailed figure for complex number dimension decreaser $DDQ_1$.
Figure 44:
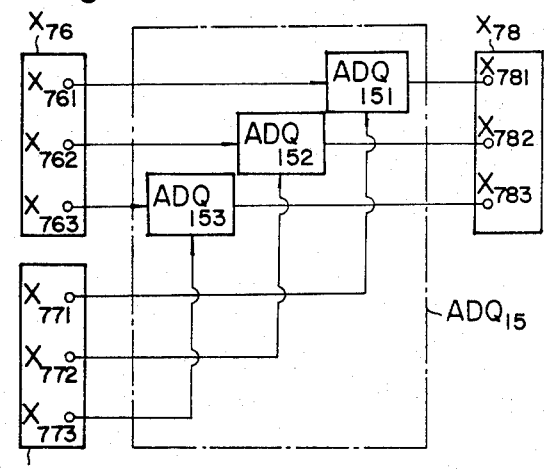
FIG. 44 is a detailed figure for complex number adder $ADQ_{15}$.
Figure 45:
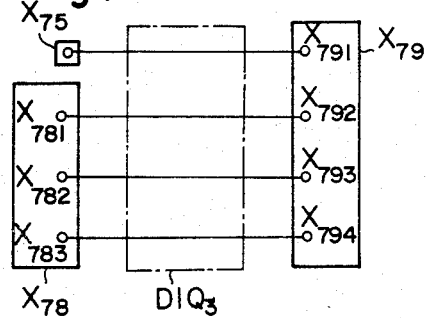
FIG. 45 is a detailed figure for complex number dimension increaser $DIQ_3$.
Figure 47:
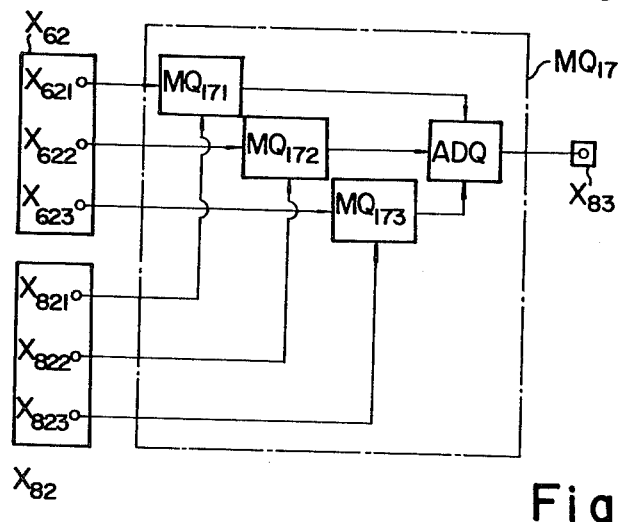
FIG. 47 is a detailed figure for complex number multiplier $MQ_{17}$.
Figure 48:
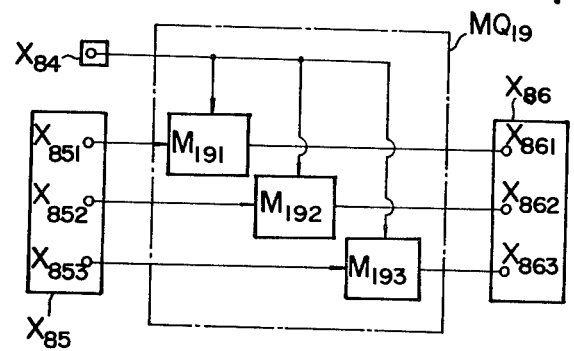
FIG. 48 is a detailed figure for complex number multiplier $MQ_{19}$.
Figure 49:
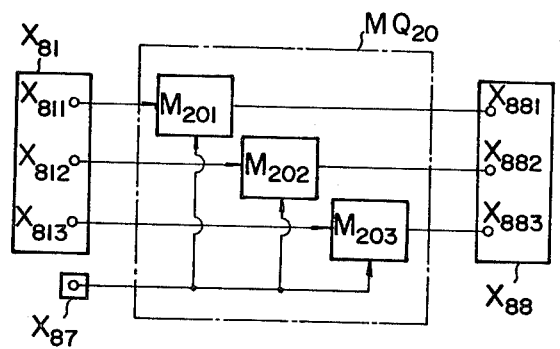
FIG. 49 is a detailed figure for complex number multiplier $MQ_{20}$.
Figure 50:
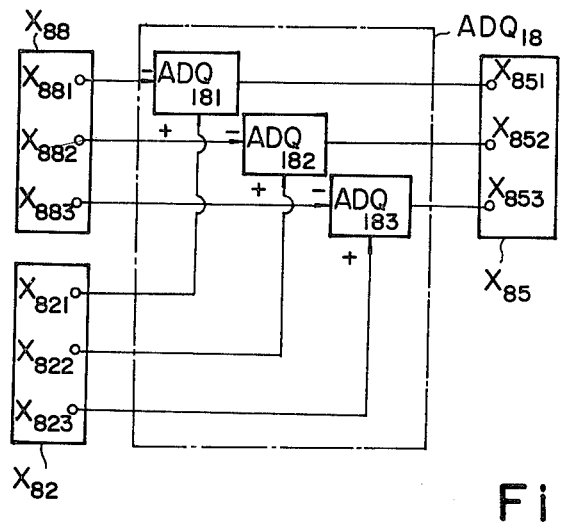
FIG. 50 is a detailed figure for complex number adder $ADQ_{18}$.
Figure 51:
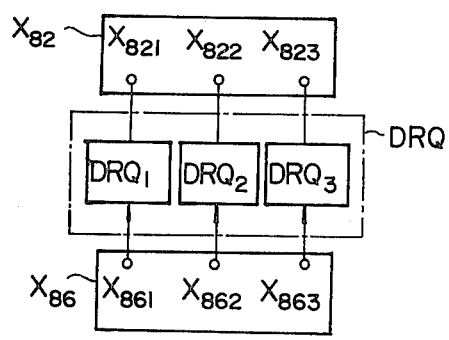
FIG. 51 is a detailed figure for complex number D resister DRQ.

Following is depiction of components consisting complex number S resister PTSQ. FIG. 40 is detailed description of complex number multiplier MQ$_{14}$. This is consisted of unit complex number multipliers MQ$_{141}$ through MQ$_{143}$ and complex number adder ADQ. The description of ADQ$_{13}$ will be omitted as it is composed only of single complex number adder ADQ$_{13}$. FIG. 41 is separate type description in detail of complex conjugate generator C$_2$. This looks like a part of complex conjugate generator C in FIG. 15. SIQ is single sign invertor. Of course dotted lines denote leads carrying real numbers and chain lines leads of imaginary numbers. Explanation for MQ$_{13}$ and ADQ$_{14}$ will be omitted because they are consisted only of single complex number multipliers and adders. Also expression of complex number S resister SRQ will be skipped because it is composed of single complex number resisters. Above descriptions are for complex number S resister controller PTSQ and following illustrations are minute expression of components consisting complex number D resister controller PTDQ. FIG. 42 depicts the complex number inverse value generator INQ$_1$ in detail. M$_{11}$ through M$_{14}$ are composed of single real number multipliers. SQ$_{11}$ is square root generator which generates square root value of its input and can be composed of by the methods similar to the ones in widely used electronic calculators. IN$_{11}$ is inverse value generator which provides the inverse value of its input and can be composed of circuits similar to the ones in electronic calculators. SIQ is sign invertor having the same configuration as those used in complex conjugate generator in FIG. 41. Complex number inverse value generator INQ$_1$ as a whole provides the value of $(a-jb)/\sqrt{a^2+b^2}$ at the point X$_{74}$ when input value of $(a+jb)$ is applied at the input point of X$_{73}$. j is of course imaginary number unit. For complex number multiplier MQ$_{15}$ composed by one signal complex number multiplier, the explanation is omitted. FIG. 43 is detailed description of complex number multiplier MQ$_{16}$, where MQ$_{161}$ through MQ$_{163}$ are single complex number multipliers. FIG. 44 is minute figure of complex number adder ADQ$_{15}$ which is built with single adders ADQ$_{151}$ through ADQ$_{153}$. FIGS. 45 and 46 are, respectively, minute figures for complex number dimension increaser DIQ$_3$ and complex number dimension decreaser DDQ$_1$. These are composed only of wirings between their terminals. FIG. 47 is detailed description of complex number multiplier MQ$_{17}$ which is implemented by single complex number multipliers MQ$_{171}$ through MQ$_{173}$ and a complex number adder ADQ. Complex number adder ADQ$_{16}$, complex number multiplier MQ$_{18}$ and complex number adder ADQ$_{17}$ are composed of single adders or multipliers and therefore description of them will be omitted. Unit value generator generating the value of 1 can be made with a ROM (Read Only Memory) storing the value of 1. Explanation for complex number inverse value generator INQ$_2$ is skipped because of the fact that INQ$_2$ is identical with INQ$_1$ formerly expressed. FIG. 48 is detailed figure for complex number multiplier MQ$_{19}$ where M$_{191}$ and M$_{192}$ are single complex number multipliers. FIG. 49 is figure for complex number multiplier MQ$_{20}$ in detail, M$_{201}$ through M$_{203}$ being single complex multipliers. FIG. 50 is complex number adder ADQ$_{18}$ composed of three single adders ADQ$_{181}$ through ADQ$_{183}$ where each single adder operates subtraction by inverting sign of its input signal according to + and − signs in the figure and conducting addition afterward. FIG. 51 is figure in length of complex number D resister DRQ composed of three single resisters DRQ$_1$ through DRQ$_3$. Above is the illustration of complex number D resister controller PTDQ.

Figure 52:
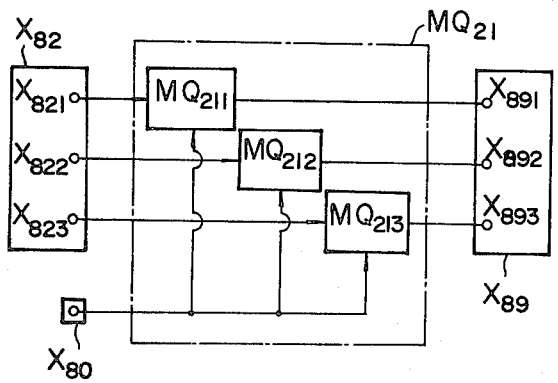
FIG. 52 is a detailed figure for complex number multiplier $MQ_{21}$.
Figure 53:
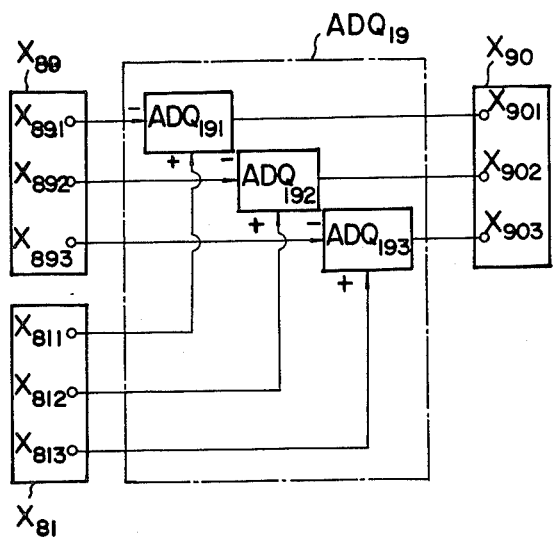
FIG. 53 is a detailed figure for complex number adder $ADQ_{19}$.
Figure 54:
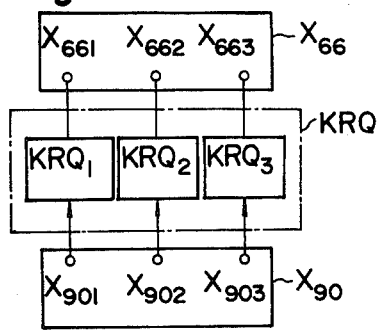
FIG. 54 is a detailed figure for complex number k resister kRQ.

Following is the comments on component composing complex number k resister controller PTkQ. FIG. 52 is the figure for complex number multiplier MQ$_{21}$ which is constituted with three single complex number multiplier MQ$_{211}$ through MQ$_{213}$. FIG. 53 is detailed drawing for complex number adder ADQ$_{19}$ which is made of three single adders ADQ$_{191}$ through ADQ$_{193}$. FIG. 54 is figure for complex number k resister kRQ. This is built with three single complex resisters kRQ$_1$ through kRQ$_3$.

These in all are detailed descriptions for the components in FIG. 27, which all are realized by formerly known hardwares. Contrasting with conventional real number fast Kalman equalizer FKEQA which can only handle real input and which can only generate real impulse response characteristics for its transmission function and which can only operate under the condition that signals entering at the information symbol input point is of real value, the complex number fast Kalman equalizer FKEQQ with the configuration in FIG. 27 can operate equalization even when either or all of above mentioned real value restrictions are not met. In other word, this equalizer can be used as equalizer EQQ for QAM modulation system in FIGS. 3 and 4.

Figure 55:
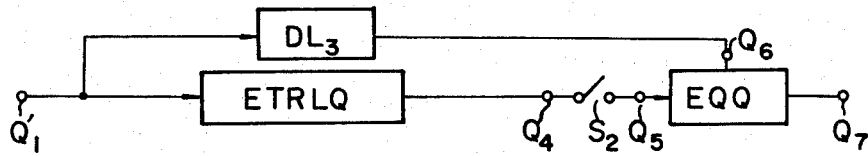
FIG. 55 is a figure for portion around equalizer extracted from equivalent circuit for QAM modulation data transmission system.
Figure 56:
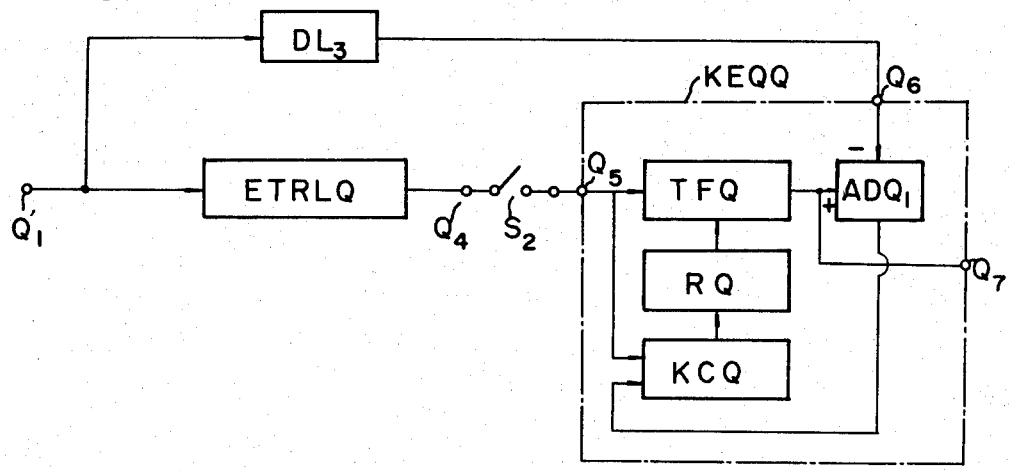
FIG. 56 is a modification of FIG. 55 in which complex number fast Kalman equalizer KEQQ is used as complex number equalizer EQQ.
Figure 57:
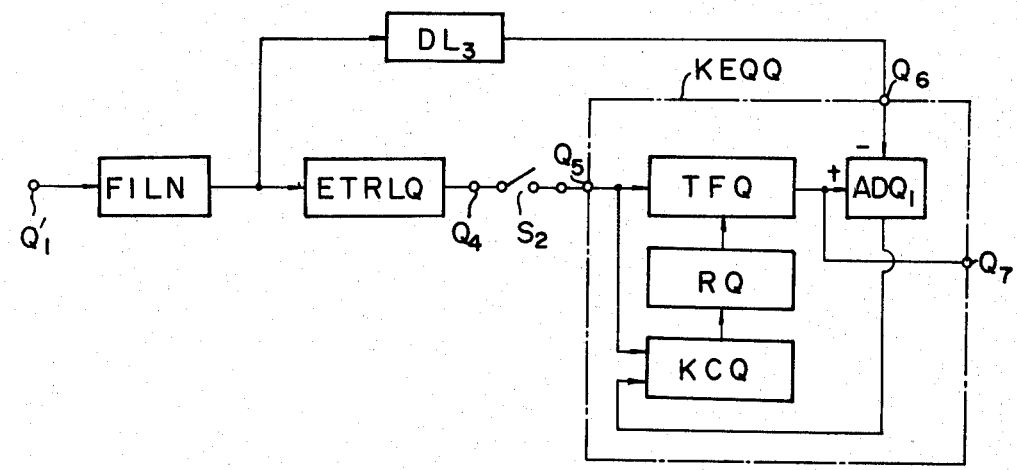
FIG. 57 is a figure obtained by introduction of band pass filter directly after the input point of complex information value.
Figure 58:
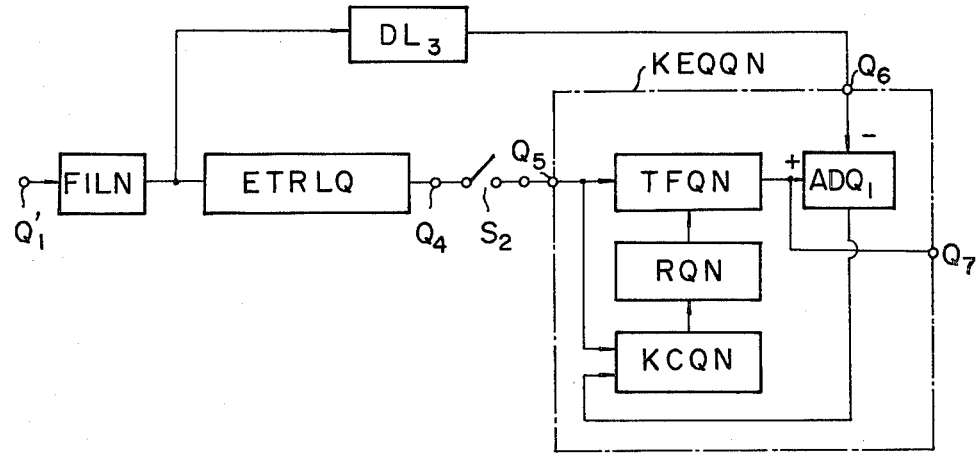
FIG. 58 is a figure obtained by modification of the configuration in FIG. 57 taking advantage of bandwidth restriction of signal in the configuration.

Henceforth bandwidth division equalizer is treated and preparatory explanation in given first. FIG. 55 is a region extracted from FIG. 4 necessary for the illustration here. Point Q$_1$′ corresponds to output port of adder SUM$_4$ to which complex number information signal appears. This point is called input point of complex information value contrasting with input point of information symbol Q$_1$ in FIG. 4. The situation in FIG. 55 where points Q$_4$, Q$_5$, Q$_6$ and Q$_7$ are input point of sampler, input point of automatic equalizer, input point of reference signal and output point of automatic equalizer has not changed from that in FIGS. 3 and 4. EQQ, ETRLQ and DL$_3$ are complex number equalizer, complex number equivalent base band transmission line and complex number delay line for obtaining reference signal respectively. The path of reference signal is now illustrated in real line instead of dotted line in FIG. 4 reflecting the fact that this path is as important as main path. As for complex number equalizer in FIG. 55 either complex Kalman equalizer KEQQ shown in FIGS. 7 and 8 or complex number fast Kalman equalizer KKEQQ in FIG. 26 or 27 can be utilized. Taking advantage of capability of handling complex number, bandwidth division type of equalizers are deduced by modification of above two types of equalizers. Accordingly two types of bandwidth division type of equalizers, namely bandwidth division Kalman equalizer deduced from complex number Kalman equalizer and bandwidth division fast Kalman equalizer from complex number fast Kalman equalizer, can be introduced. The explanation here is made only for the case of the former for the simplicity of explanation. The introduction of the latter is evident from that of former. Other types of complex number equalizer, for example learn and identification type of equalizer used widely, can be arranged into bandwidth division type of equalizers. They will not be, nevertheless, treated in this invention because of their inferior behavior. The complex number automatic equalizer EQQ in FIG. 55 conducts action of equalization over the bandwidth amount of $2\pi/T$ (radian/second) situated on the range of $-\pi/T$ to $+\pi/T$ (radian/second), in consequence of the fact that the equalizer has tapped delay lines of T second tap spacing which is equal in amount to the symbol sending interval of the data transmission system and that it has sampler $S_2$ conducting sampling at the interval of T second at its input point. The transmission system shown in FIG. 55 thus conforms well to the nature of information source which generates symbol value at the input point of complex information value $Q_1'$ every T second and which has, as a result, a frequency characteristics of its output signal repeating its characteristics between $-\pi/T$ and $+\pi/T$ (radian/second) at the frequency of $2\pi/T$ (radian/second). The bandwidth division type of equalizer deduced from complex number Kalman equalizer KEQQ will be obtained through the use of the configuration of FIG. 56 which utilizes KEQQ as complex number equalizer EQQ. At the figure, KEQQ is expressed by the block diagram shown in FIG. 7. As is in FIG. 7, KEQQ denotes complex number Kalman equalizer and TFQ is complex number transmission function including tapped delay line of T second tap spacing. RQ and KCQ, again, are complex number resister storing tap weights and complex number Kalman controller giving rise to variation information of tap weights. The points $Q_1'$ through $Q_7$ in FIG. 56 are the same points shown in FIG. 55 with the same notations. Next the configuration of FIG. 57 will be introduced. The difference between this figure and FIG. 56 lies in that there exists band pass filter FILN after the input point of complex information value $Q_1'$. FILN has pass band bandwidth of $2\pi/NT$ (radian/second) which amounts one N'th of the equalizing frequency bandwidth of $2\pi/T$ (radian/second) of the complex number Kalman equalizer KEQQ. N is arbitrary chosen integer. For tapped delay line in the complex number transmission function TFQ in configuration of FIG. 57, or more precisely complex number tapped delay line $TDLQ_1$ in TFQ illustrated in FIG. 8, necessary tap spacing becomes to be NT (second) instead of original T (second). This is resulted from the fact that equalizer, effective equalization of which is expected only at the bandwidth of $2\pi/NT$ (second) must have tapped delay line with tap spacing as small as NT (second). This is proved by following facts. A transversal filter with taps of NT second tap spacing repeats its frequency characteristics at $2\pi/NT$ (radian/second) interval. Consequently, if the tap weights of the transversal filter are consisted of complex number, the transversal filter can provide arbitrary characteristics for a bandwidth of $2\pi/NT$ (radian/second) at arbitrary position of frequency axis. As a result, transversal filter with complex number tap weights and NT second tap spacing can provide arbitrary transmission characteristics for any band limited signal with bandwidth restricted to $2\pi/NT$ (radian/second). For the above mentioned reason, tap spacing at the complex number tapped delay line $TDLQ_1$ contained in the complex number transmission function TFQ in FIG. 57 needs to be only NT second. These are the proofs. Transversal filter of NT second of tap spacing but with real number tap weight does not have above mentioned property. This is due to the fact that this type of transversal filter can only have frequency characteristics which is symmetrical with the frequency spots of $2\pi i/NT$ (radian/second), where i is any integer, and can not provide arbitrary characteristics at arbitrary position of frequency axis. Based on above mentioned considerations, the system shown in FIG. 58 is introduced. Henceforth the operation of this system will be discussed. KEQQN and its composing parts of TFQN, RQN, and KCQN are respectively, a kind of, complex number Kalman equalizer, complex number transmission function, complex number resister and complex number Kalman controller. Constructions of these components are different from corresponding parts in FIG. 57 in that tap spacing involved in complex number transmission function TFQN and complex number Kalman controller KCQN is altered to NT second and accompanying changes such as tap number alternation are done. KEQQN, TFQN, RQN and KCQN are called Kalman equalizer with NP tap spacing, transmission function with NT tap spacing, resister with NT tap spacing and Kalman controller with NT tap spacing respectively. Components in FIG. 58 which are not suffered from name alternation are denoted with the same names and abbreviations as those in FIG. 57. $S_2$, as before, conducts sampling at T second frequency.

Because transmission function provided from associated operation of transmission with NT tap spacing TFQN and resister with NT tap spacing RQN can give, as formerly mentioned, arbitrary frequency characteristics on the pass band of band pass filter FILN, RQN at the Kalman equalizer with NT tap spacing can be brought into convergence by controlling RQN so that complex number adder $ADQ_1$ does not produce any output. One thing to be remarked is that state of RQN at the convergence is the same when position and bandwidth of band pass filter FILN on the frequency axis is the same, irrespective of characteristics of FILN on its passband. This is due to the fact that Kalman equalizer with NT tap spacing KEQQN must equalize complex number equivalent base band transmission line ETRLQ over whole pass band of FILN and that goal of convergence for RQN must be unique.

Figure 59:
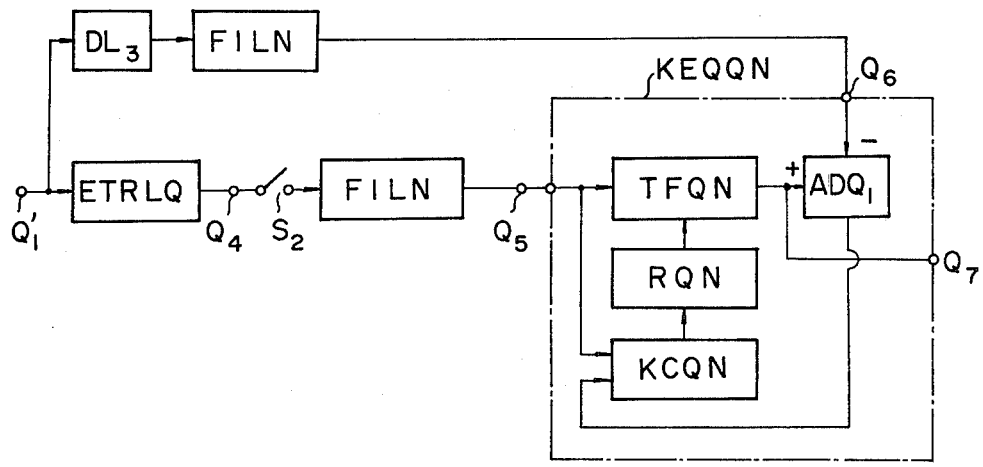
FIG. 59 is a figure reduced from composition in FIG. 58 by moving the position of band pass filter.

It is evident that boundary conditions for Kalman equalizers with NT tap spacing KEQQN are the same both for FIG. 59 and FIG. 58, as constitution of FIG. 59 is obtained from that of FIG. 58 by moving FILN in FIG. 58, over the junction point, as near as possible to KEQQN with the side effect of increase of number of FILN to 2. The exchange of position between sampler $S_2$ and band pass filter FILN is possible because the bandwidth treated is limited to $2\pi/T$ second and also because whole system is linear one. $Q_4$ and $Q_5$ are again input point of sampler and input point of automatic equalizer respectively. The system in FIG. 59 consists the fundamental structure of bandwidth division type of equalizers. The synthesized result of above mentioned technics is bandwidth division Kalman equalizer consisting a major part of this invention.

Figure 60:
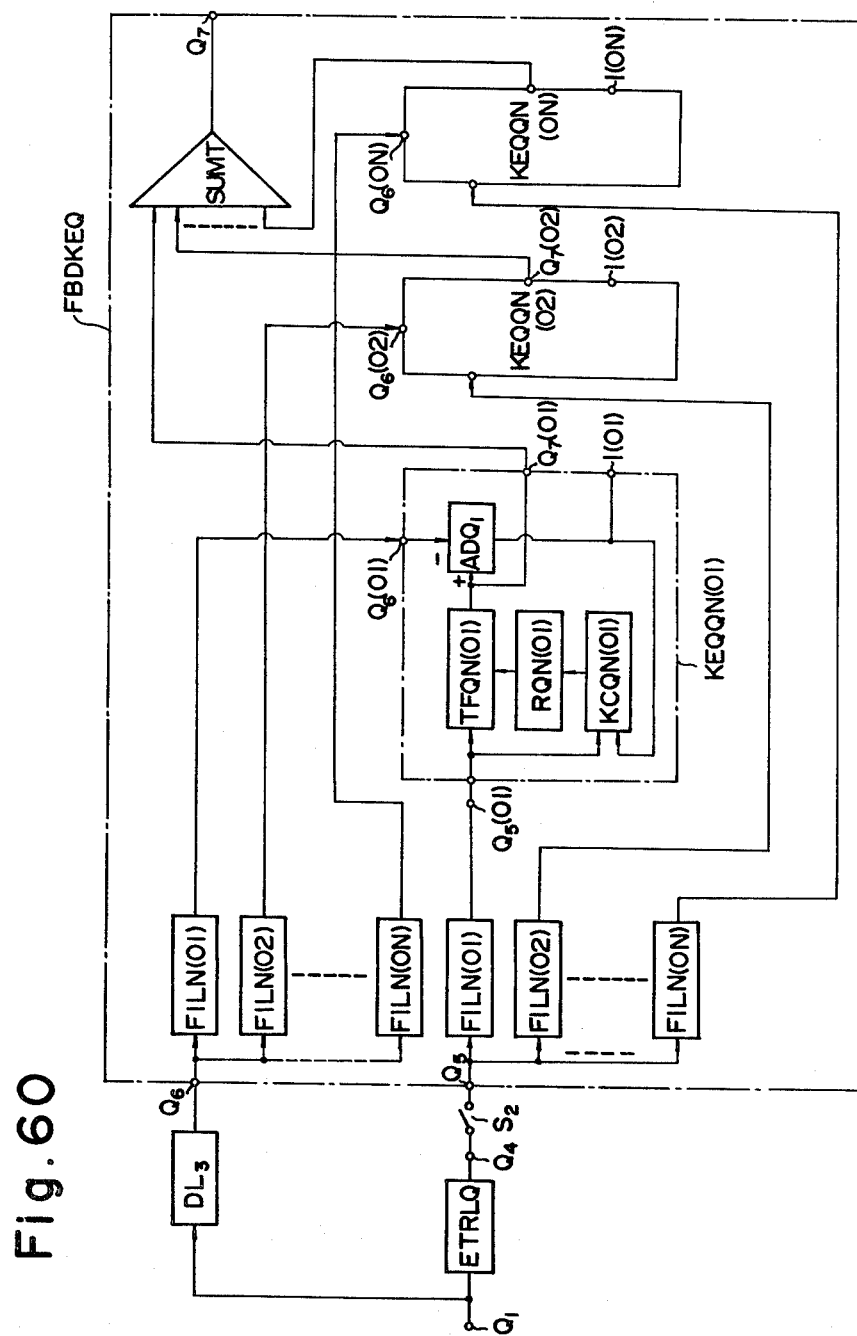
FIG. 60 is the figure showing a construction method of bandwidth division Kalman equalizer.
Figure 61A:
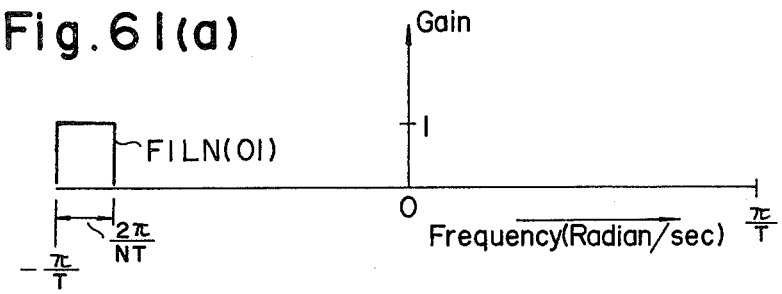
FIGS. 61(a) through (d) are figures of characteristics of band pass filters used in the equalizer in FIG. 60.
Figure 61B:
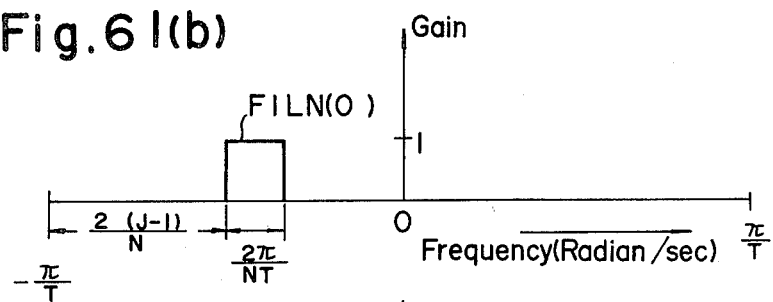
Figure 61C:
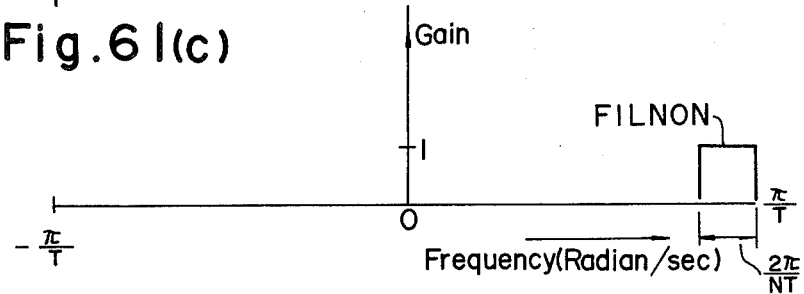
Figure 61D:
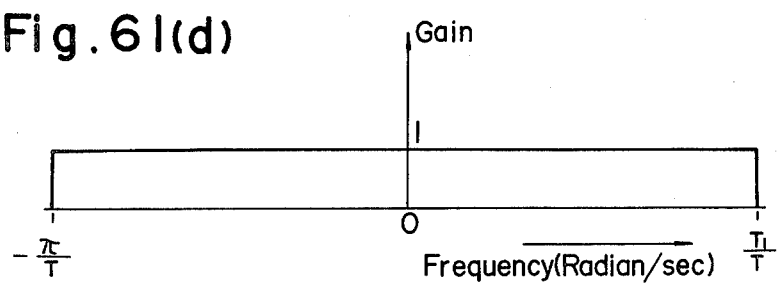

A case of realization of this invention is given in FIG. 60. This is the figure of bandwidth division Kalman equalizer BDKEQ which operates through division of frequency bandwidth ranging from $-\pi/T$ (radian/second) to $\pi/T$ (radian/second) to N sub-bandwidth.

Figure 62:
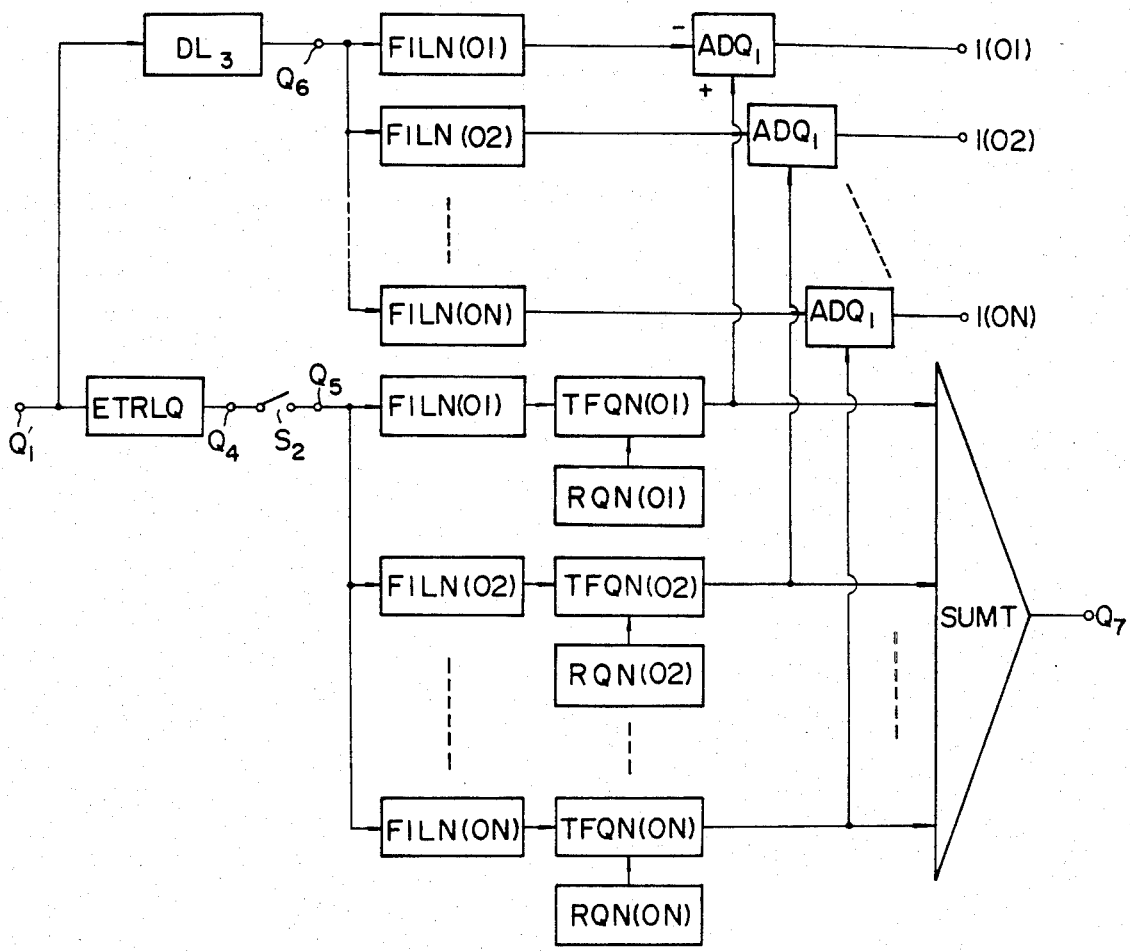
FIG. 62 is the figure for explanation of operation of bandwidth Kalman equalizer laying emphasis on signal path.
Figure 63:
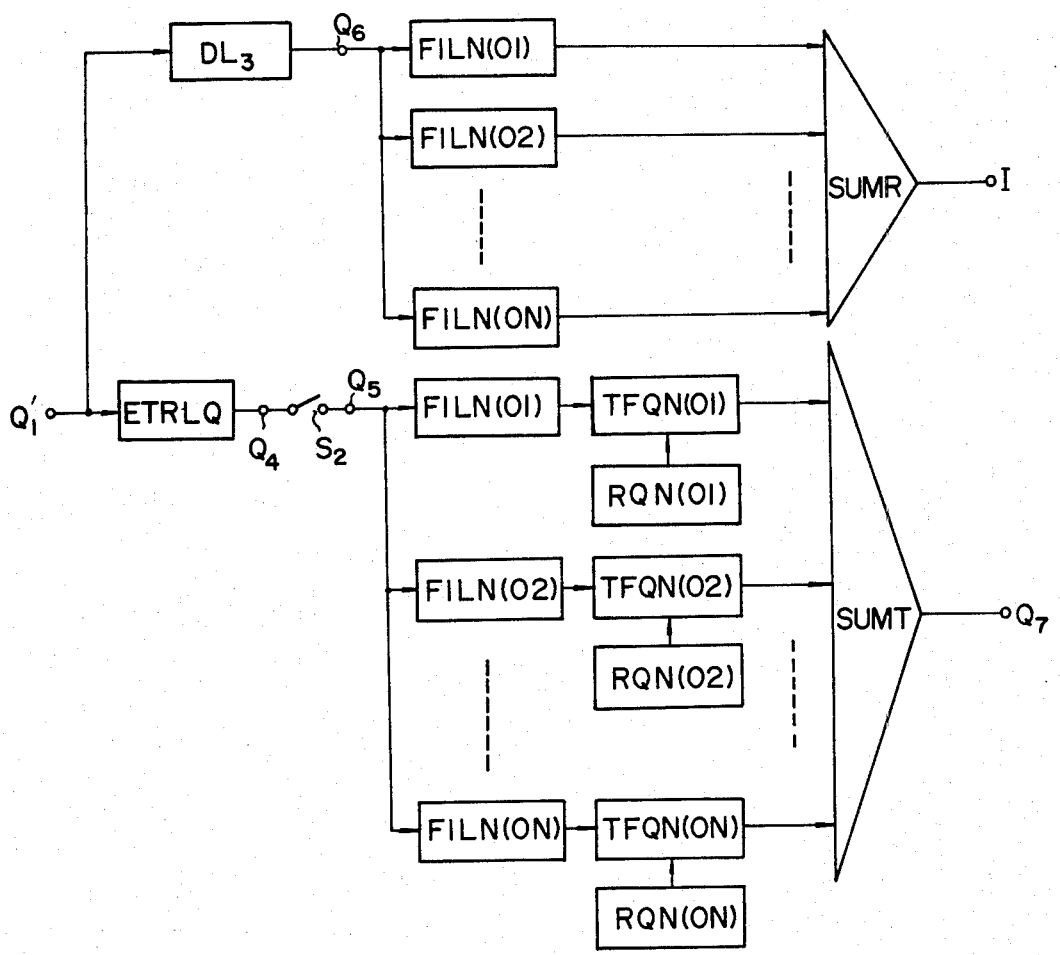
FIG. 63 is the figure for illustration of correctness of convergence at bandwidth division equalizer.
Figure 64:
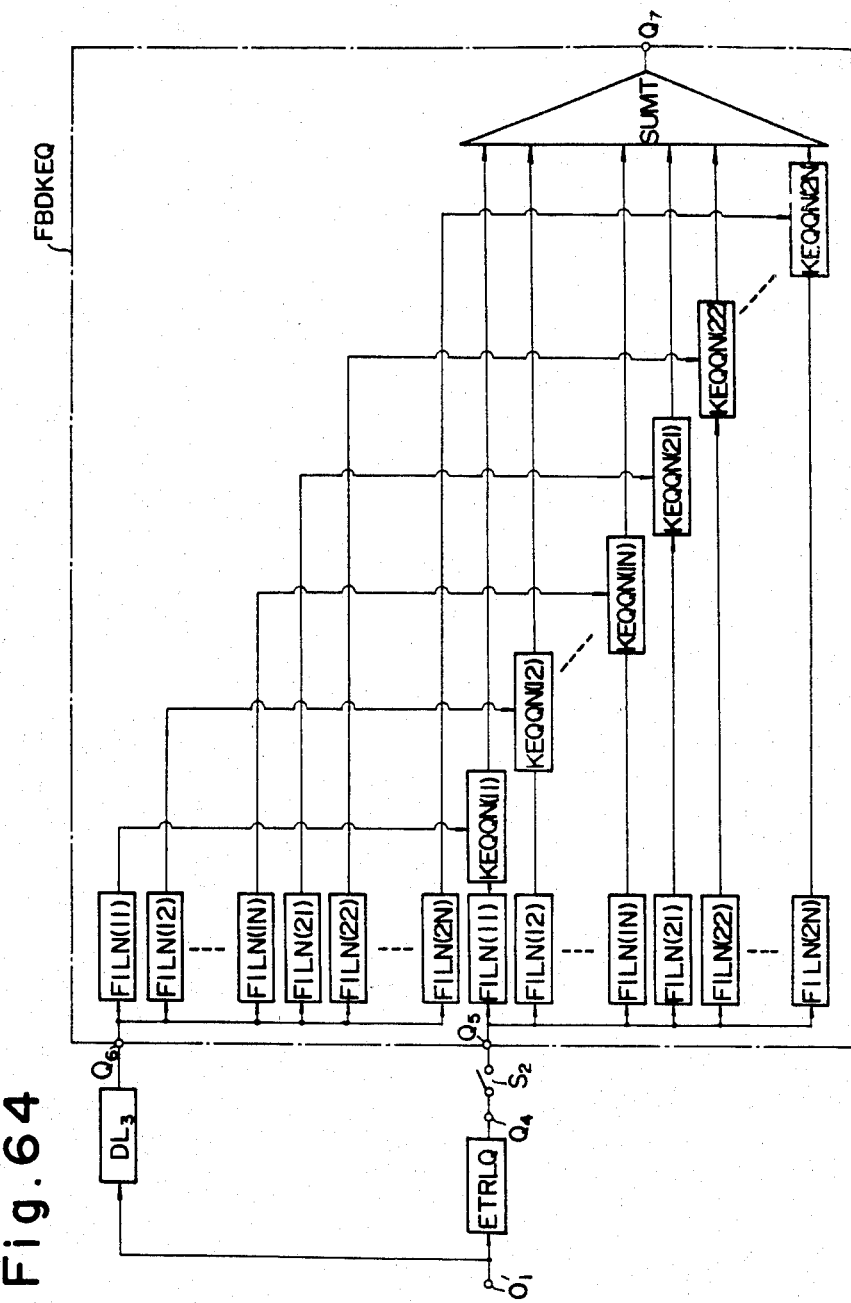
FIG. 64 is a figure for another type of bandwidth division Kalman equalizer.
Figure 65A:
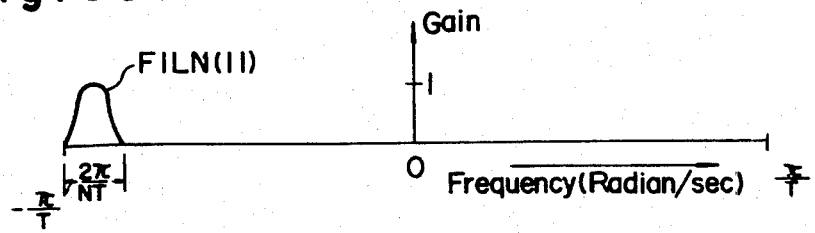
FIGS. 65(a) through (c) are figures of characteristics of band pass filters used in the equalizer in FIG. 64, FIGS. 66(a) through (c) are figures continued from FIG. 65.
Figure 65B:
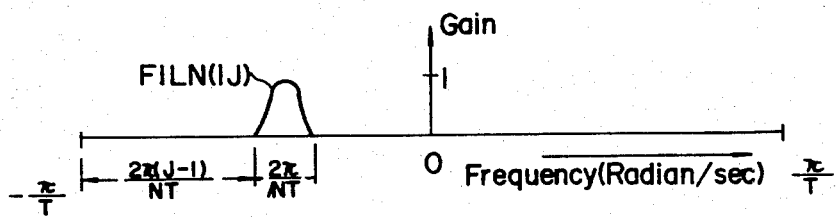
Figure 65C:
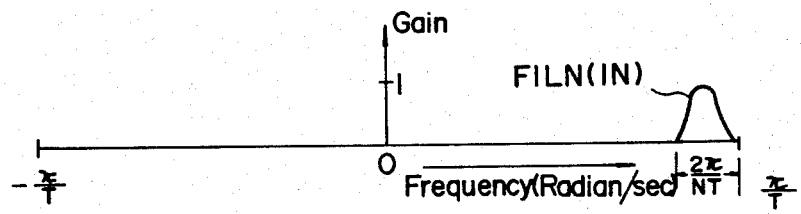
Figure 66A:
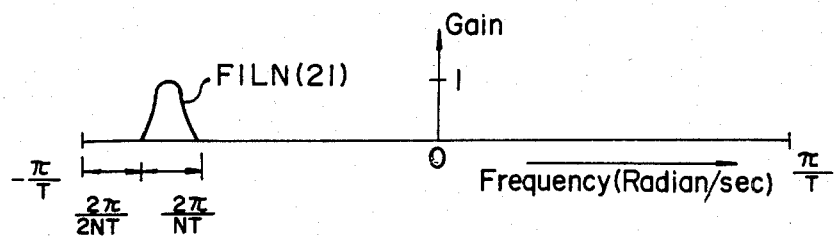
Figure 66B:
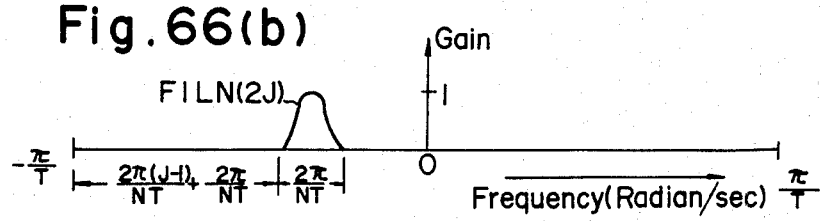
Figure 66C:
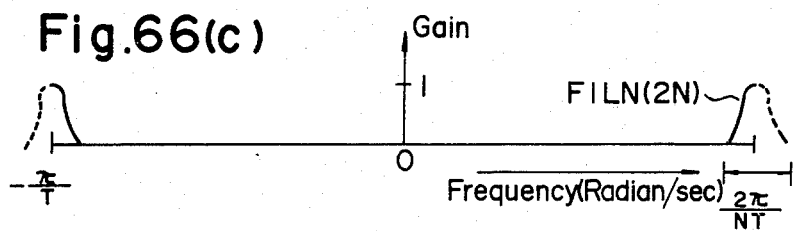

$Q_1'$, $Q_4$, $Q_5$, $Q_6$ and $Q_7$ in FIG. 60 are, as before, input point of complex information value, input point of sampler, input point of automatic equalizer, input point of reference signal and output point of automatic equalizer respectively. FILN(0J)'s (J is an integer between 1 to N) are band pass filter with rectangular frequency gain characteristics and no phase characteristics, which are represented with characteristics for FILN(01), FILN(0J) and FILN(0N) at FIGS. 61(a), (b) and (c) respectively. The whole sum of transmission characteristics of these FILN(0J)'s is that of through (direct connection) circuit. KEQQ(01) through KEQQ(0N) are Kalman equalizers with NT tap spacing mentioned before and are the same in their configuration. KEQQ(0J), for example, is called (0J) Kalman equalizer with NT tap spacing according to the number attached. Similarly, FILN(0J) is called as (0J) band pass filter. In FIG. 60, composition of KEQQN(0J) is shown as represented by composition of KEQQN(01). TFQN(01), RQN(01), KCQN(01) and $ADQ_1$(01) in FIG. 60 are called, for example, (01) transmission function with NT tap spacing, (01) resister with NT tap spacing, (01) Kalman controller with NT tap spacing, and (01) complex number adder respectively. Junction points KEQQN(01) to outer circuit, for example, is designated in the manner where $Q_5$(01), $Q_6$(01) and $Q_7$(01) are input point of (01) automatic equalizer, input point of (01) reference signal and output point of (01) equalizer respectively. I(01), for example, is the point added for the purpose of explanation and is output point of error signal at KEQQN(01) and called output point of (01) error signal. The configuration of FIG. 60 for bandwidth division Kalman equalizer BDKEQ is consisted of parallel connection of many complex number Kalman equalizers and consequently this configuration can converge because each component equalizer KEQQN(0J) is proved to have ability of convergence. There is no error signal at the output of each I(0J) when convergence is attained at KEQQN(0J). For the purpose of investigating behavior of bandwidth division Kalman equalizer BDKEQ after convergence, FIG. 60 is rewritten into FIG. 62 in which more clear expression of signal path is provided. Taking into account of the fact that convergence is attained and that complex information value appears at $Q_1'$ every T second, it will be concluded that output of each I(0J) terminal is 0 and that output signal of FILN(0J) connected to complex number delay line $DL_3$ is identical to the output signal of TFQN(0J). From self evident fact that two sum totals of signals are mutually identical when each corresponding component consisting these two sum totals is mutually identical, two output signals in FIG. 63 obtained by modification of FIG. 62, namely output from $Q_7$ and output from point I, are identical. Point I is called error output point of automatic equalizer. SUMR is, like SUMT, concentrator summing N signals. Resulting from the characteristics shown in FIG. 61(d), circuit consisted from FILN(0J)'s connected to complex number delay line $DL_3$ and SUMR reduces to through (direct connection) circuit. Taking into consideration of the fact that signal at input point of complex information value $Q_1'$, with some delay, emerges at point I and that signal at the output point $Q_7$ of BDKEQ in convergence condition is identical with signal at point I, it will be concluded that signal at point $Q_7$ is very signal needed as equalizer output and that BDKEQ illustrated in FIG. 60 is necessary equalizer circuit. A way of realizing this invention other than the one shown in FIG. 60 or another example of this invention which makes use of other composing method of bandwidth division Kalman equalizer BDKEQ with other way of bandwidth division, is shown in FIG. 64. Contrasting to the system of FIG. 60 where N band pass filters FILN(01) through FILN(0N) are used, the system in FIG. 64 has 2N band pass filters and accordingly 2N Kalman equalizer with NT tap spacing KEQQ's. For each KEQQN corresponding to each band pass filter FILN(iJ) (i=1, 2; J=1 to N), number is attached, as is in FIG. 60, in the method like KEQQN(iJ) etc. Though the system in FIG. 64 is not different especially from system in FIG. 60 in the sense of configuration, each characteristic of FILN(iJ) (i=1, 2; J=1 to N) is drastically different from that of FILN(0J) (J=1 to N) in FIG. 61 in that characteristics in FIGS. 65 and 66 which are those of FILN(iJ)'s (i=1, 2; J=1 to N) are much gentle in shape compared with that of FILN(0J)'s. In FIGS. 65(a), (b) and (c), frequency gain characteristics of FILN(11), FILN(1J) and FILN(1N) are given. FILN(1J)'s (J=1 to N) are called as band pass filters of first series. Frequency gain characteristics for FILN(21), FILN(2J) and FILN(2N) are shown in FIGS. 66(a), (b) and (c) respectively. These are called band pass filters of second series. These FILN(iJ)'s (i=1, 2; J=1 to N) have no phase characteristics. From the fact that each band pass filter has pass bandwidth of $2\pi$/NT (radian/second), formerly mentioned situation that these filters cooperate with Kalman equalizer with NT tap spacing giving rise to appropriate equalizer operation, remains unaltered. Band pass filters of first and second series compensate each other at their common pass band resulting in flat transmission characteristics as the sum of them. Total sum of 2N transmission characteristics provided by 2N filters FILN(11) through FILN(2N) is reduced again to that of through (direct connection) circuit shown in FIG. 61. Thus, as a consequence of the facts discussed concerning with FIGS. 62 and 63, bandwidth division Kalman equalizer BDKEQ given in FIG. 64 can conduct equalization. Band pass filters FILN(iJ) (i=1, 2; J=1 to N) which are used in the system of FIG. 64 and characteristics of which are given in FIGS. 65 and 66, have more gentle characteristics and, as a result, have a merit of needing less tap number when constructed by transversal filter configuration, compared to the band pass filters FILN(0J)'s (J=1 to N) which are used in the composition of FIG. 60 and whose characteristics are shown in FIG. 61. Necessary tap number to provide characteristics shown in FIGS. 65 and 66 is normally about 16N (N is number of bandwidth division) and 80N for that in FIG. 61.

Figure 67:
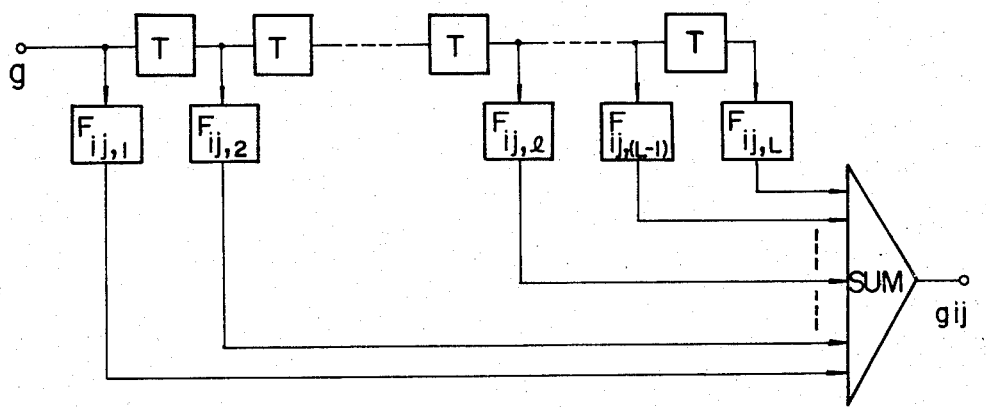
FIG. 67 is the figure showing the construction way of band pass filter utilizing configuration of transversal filter.

These are detailed descriptions of bandwidth division Kalman equalizer BDKEQ shown in FIGS. 60 and 64. Henceforth construction methods of band pass filters FILN(iJ) (i=0, 1 and 2; J=1 to N) are dealt with. The construction of FILN(iJ) (i=0, 1 and 2; J=1 to N) is given as shown in FIG. 67. The configuration in FIG. 67 is transversal filter of L taps (L is a certain integer) where T is of course delay element of T second and $F_{iJl}$'s (i=0, 1 and 2; J=1 to N; l=1 to L) are l'th tap weight coefficient in the band pass filter of FILN(iJ). Parts of $F_{iJl}$'s in FIG. 67 provide the values of their input signals multiplied by the amount of $f_{iJl}$ which is value of tap weight of $F_{iJl}$ at their output. SUM is of course concentrator. For the convenience of description, input terminal of FILN(iJ) is denoted as g and output terminal as $g_{iJ}$. L, as mentioned before, must be chosen to be about 80N for FILN(0J)'s and about 16N for FILN(iJ)'s (i=1 and 2). Tap weights $f_{0,J,l}$ (J=1 to N; l=1 to L) for filter FILN(0J) with rectangular frequency gain characteristics used in the configuration of FIG. 60 is given by following Eq. (27).

$$f_{0,J,l} = \frac{\sqrt{N}}{\sqrt{2q}} \times \frac{1}{l-A}\left(\sin\frac{q}{N}(l-A)\right) \times e^{j\frac{q}{NT}(2J-1+N)(l-A)} \quad (27)$$

The character at the right shoulder of exponential symbol e denotes imaginary number unit and not number of band pass filter. The value of A must be chosen to be L/2 or the number nearest to that value. Next, one example of values of $f_{i,J,l}$ (i=1 and 2; J=1 to N; l=1 to L) are given in following Eqs. (28) and (29).

$$f_{1,J,l} = -\frac{\sin\frac{q}{2N}(l-A)}{\frac{q(l-A)}{2N}} \times \frac{\cos\frac{q}{2N}(l-A)}{1-\frac{(l-A)^2}{N^2}} \quad (28)$$

$$\times e^{j\frac{q}{NT}(2J-1+N)(l-A)}$$

$$f_{2,J,l} = -\frac{\sin\frac{q}{2N}(l-A)}{\frac{q(l-A)}{2N}} \times \frac{\cos\frac{q}{2N}(l-A)}{1-\frac{(l-A)^2}{N^2}} \quad (29)$$

$$\times e^{-j\frac{q}{NT}(l-A)} \, e^{j\frac{q}{NT}(2J-1+N)(l-A)}$$

The notation of j at the right shoulder of exponential symbol e is explained above. FILN(iJ) (i=1 and 2; J=1 to N) obtained by the use of these coefficients have gentle frequency gain characteristics of raised cosine type shown in FIGS. 65 and 66. The first series filters FILN(1J)'s and second series ones FILN(2J)'s mutually compensate their gain characteristics at their common pass bands resulting in flat transmission gain characteristics by addition by mutual addition. Synthesized transmission function of these filters is of course that of through (direct connection) circuit. The band pass filters with tap weights given by Eqs. (28) and (29) can be applied to the bandwidth division Kalman equalizer of the type of FIG. 64. These are explanation of composing method of FILN(iJ) (i=1 and 2; J=1 to N).

Figure 68:
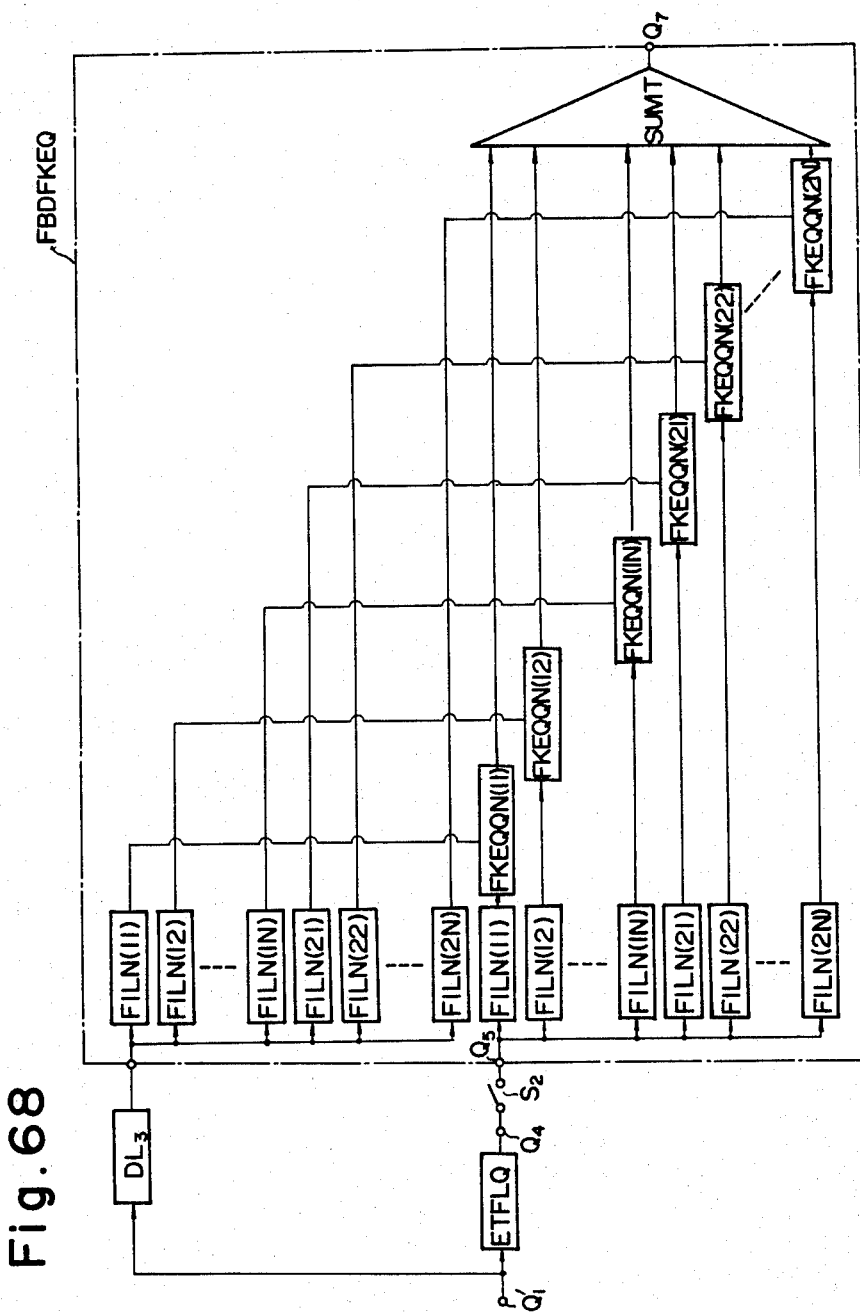
FIG. 68 is a figure for bandwidth division fast Kalman equalizer.

Above illustration is concerned with bandwidth Kalman equalizer making use of Kalman equalizers with NT tap spacing each of which is related to a pass band provided by one of FILN(iJ) (i=0, 1 and 2; J=1 to N) filters. These equalizers working on pieces of partial bandwidth which amount to be N pieces in the composition of FIG. 60 and 2N in the composition of FIG. 64 are called partial equalizers. Only necessities concerning partial equalizers are that they must have NT second of tap spacing and can deal with complex numbers and hence conventional complex number learn and identification equalizer may have qualifications for partial equalizer. Because of low convergence ability, this kind of equalizer will not be treated in this invention. Nevertheless, the bandwidth division fast Kalman equalizer BDKEQ which utilizes complex number fast Kalman equalizer composing a part of this invention and formerly dealt with minutely for its composition and action, is very useful system for the reason of good convergence characteristics and small amount of calculating labor. The composition of BDKEQ which uses band pass filters of the type shown in FIGS. 65 and 66 is illustrated in FIG. 68. The composition of FIG. 68 can be obtained from composition of bandwidth division Kalman equalizer BDKEQ shown in FIG. 64 by replacing each (iJ) Kalman equalizer with NT tap spacing KEQQ(iJ) with (iJ) fast Kalman equalizer with NT tap spacing FKEQQ(iJ). Each (iJ) fast Kalman equalizer with NT tap spacing FKEQQ(iJ) is identical with each other and can be realized by complex number fast Kalman equalizer FKEQQ shown in FIGS. 26 and 27 with modification of change from original T second to NT second of tap spacing at complex tapped delay lines $TDLQ_1$ and $TDLQ_2$ involved in complex number transmission function TFQ and complex number fast Kalman controller FKCQ respectively and also change of delay, from original T second to NT second, of complex number delay elements $DLQ_1$ and $DLQ_2$ and consequent reduction of tap number. Each component and point in FIG. 68 are the same ones with the same notations in FIG. 64.

The explanation so far made in this invention will be summarized as follows. The role of automatic equalizers of real number and complex number types is illustrated first and consecutively conventional technics such as real number Kalman equalizer, complex number Kalman equalizer and real number fast Kalman equalizer are dealt with. The illustrations of new findings composing this invention are given following these explanations. Complex number fast Kalman equalizer and bandwidth division Kalman equalizer obtained by application of technic of bandwidth division to conventional complex number Kalman equalizer are treated in this order. Finally bandwidth division fast Kalman equalizer introduced by application of technic of bandwidth division to newly introduced complex number fast Kalman equalizer is dealt with.

These equalizers mentioned above, new and conventional included, work satisfactory, in relation to prescribed tap number, after their convergence and there are no distinctions in performances. The ratios of attained convergence and calculation labor especially multiplication amount are, however, very different among these equalizers. Necessary multiplication numbers until convergence are given as 10M (M is equalizer tap number) for fast Kalman type of equalizers and as $2N^2$ for Kalman type of equalizers. This figure can be applied for both non bandwidth division types and bandwidth division types alike. The bandwidth division type equalizers, having tap number of one N'th (n is bandwidth division number) compared with that of non bandwidth division type equalizers, provide convergence speed N times faster than that of non bandwidth division types. The comparison of multiplication times, taking above mentioned two phenomena and also the multiplication labor for operation of band pass filters into account, shows that the ratios between them are $1:\frac{1}{2}:\frac{1}{3}:\frac{1}{4}$ for Kalman, fast Kalman, bandwidth Kalman and bandwidth fast Kalman equalizers respectively, at an appropriate condition of 31 for tap number M and 16 for bandwidth division number N. This result shows systems consisting this invention provide superior operation to operation obtained from conventional equalizers. As shown minutely in this invention, equalizers proposed in this invention provide higher convergence performance in conjunction with necessary multiplication number and usefully operate at equalization of communication circuit.

From the foregoing, it will now be apparent that a new and improved Kalman equalizer has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A fast Kalman equalizer (FIG. 27) having a complex impulse response for equalizing a complex input signal comprising:
   (a) an input terminal $Q_5$ for receiving an input signal $g_k$,
   (b) a transversal filter (TFQ) coupled with said input terminal $Q_5$, said transversal filter (TFQ) having at least a tapped delay line (TDLQ$_1$) with a plurality of adjustable taps and an adder (SUMQ$_1$) for summing up all the tap outputs of said tapped delay line (TDLQ$_1$),
   (c) an output terminal $Q_7$ coupled with the output of said adder (SUMQ$_1$) for providing an equalized output signal,
   (d) a complex number adder (ADQ$_1$) for providing $e_k$ (Eq. 11),
   (e) a complex number A register controller (PTAQ) for providing $k_k$ (Eq. 14), $A_k$ (Eq. 18'), and $q_k$ (Eq. 18),
   (f) a tap gain memory (RQ) for providing a tap coefficient to said tapped delay line (TDLQ$_1$), by accepting the increment of the tap weight using the formula $\Delta \hat{h}_k = k_k e_k$ (Eq. 12),
   (g) a multiplicator (MQ$_{22}$) for providing said product ($\Delta \hat{h}_k = k_k e_k$ (Eq. 12)) of the reference signal $e_k$ from a reference terminal (Q$_6$) and $k_k$ (Eq. 14),
   (h) a complex number dimension increaser (DIQ$_1$) for providing $x_k$ (Eq. 9),
   (i) an S-register control (PTSQ) for providing (a) $\bar{v}_k$ which is the complex conjugate of $v_k$ by the complex conjugate generator (C$_2$), said $v_k$ is obtained by Eq. 19 ($v_k = g_k + A_k^T \cdot x_k$, where $A_k^T$ is the transposed matrix of the matrix $A_k$), and (b) $S_k = S_{k-1} + \bar{v}_k q_k$ (Eq. 20'), according to the values $A_k$, $x_k$, and $g_k$, where $\bar{v}_k$ is the complex conjugate of $v_k$,
   (j) a D-register control (PTDQ) for providing $D_k$ (Eq. 25), $m_k$ (Eq. 22 and Eq. 21), and $w_k$ (Eq. 23),
   (k) a k-register control (PTkQ) for providing $k_{k+1}$ by the formula: $k_{k+1} = m_k - D_k w_k$ (Eq. 26), and
   (l) means for providing the value $k_{k+1}$ obtained in said item (k) to the multiplicator (MQ$_{22}$) of the item (g), the A-register control (PTAQ) of the item (e), and the D-register control (PTDQ) of the item (j), for the next step calculation.

2. A Kalman equalizer (FIG. 60, FIG. 64) having a complex impulse response for equalizing a complex input signal comprising:
   (a) an input terminal (Q$_1$') for receiving an input signal to be equalized,
   (b) a plurality of bandpass filters including input signal filters for dividing frequency bandwidth of the input signal and reference signal filters for dividing frequency bandwidth of a predetermined reference signal from a terminal (Q$_6$),
   (c) a plurality of partial equalizers (KEQQN) with adjustable tapped delay lines each coupled with a respective input signal filter and reference signal filter, for equalizing each divided frequency band of the input signal
   (d) an adder (SUMT) for summing up the outputs of said partial equalizers,
   (e) an output terminal (Q$_7$) coupled with the output of said adder (SUMT) for providing an equalized output signal, and
   (f) said partial equalizer being implemented by one selected from a Kalman equalizer (FIG. 8) and a fast Kalman equalizer (FIG. 27), a tap spacing in the partial equalizer being increased according to the number of said bandpass filters, and thus, the number of taps of said partial equalizer being reduced.

* * * * *